(12) United States Patent
Griffin et al.

(10) Patent No.: US 12,332,097 B2
(45) Date of Patent: Jun. 17, 2025

(54) AXIAL LiDAR DOPPLER ANALYZER

(71) Applicant: Defiant Engineering, LLC, Odessa, TX (US)

(72) Inventors: Lawrence Gene Griffin, Morrison, CO (US); Cullen Craig Keyes, Hysham, MT (US)

(73) Assignee: Defiant Engineering, LLC, Odessa, TX (US)

( * ) Notice: Subject to any disclaimer, the term of this patent is extended or adjusted under 35 U.S.C. 154(b) by 0 days.

(21) Appl. No.: 18/651,649

(22) Filed: Apr. 30, 2024

(65) Prior Publication Data
US 2024/0288293 A1 Aug. 29, 2024

Related U.S. Application Data

(63) Continuation of application No. 18/190,384, filed on Mar. 27, 2023, now Pat. No. 12,018,965.

(60) Provisional application No. 63/362,039, filed on Mar. 28, 2022.

(51) Int. Cl.
*G01F 1/663* (2022.01)
(52) U.S. Cl.
CPC .................. *G01F 1/663* (2013.01)
(58) Field of Classification Search
CPC ......................................... G01F 1/663
USPC .......................................... 73/861
See application file for complete search history.

(56) References Cited

U.S. PATENT DOCUMENTS

| | | | |
|---|---|---|---|
| 3,446,558 A | 5/1969 | Seaton | |
| 5,012,118 A | 4/1991 | Preikschat et al. | |
| 5,164,784 A | 11/1992 | Waggoner | |
| 5,178,018 A | 1/1993 | Gill | |
| 5,831,721 A | 11/1998 | Alkafeef | |
| 6,404,344 B1 | 6/2002 | Young | |
| 2002/0014224 A1 | 2/2002 | Ismailov | |
| 2005/0114046 A1 | 5/2005 | Metcalf et al. | |
| 2011/0285984 A1* | 11/2011 | Christian | G01S 7/4812 356/28.5 |
| 2014/0085635 A1 | 3/2014 | Van Der Lee et al. | |
| 2019/0285753 A1 | 9/2019 | Spruit et al. | |
| 2019/0323943 A1 | 10/2019 | Knollenberg et al. | |

(Continued)

FOREIGN PATENT DOCUMENTS

| | | |
|---|---|---|
| CN | 1934423 A | 3/2007 |
| DE | 3223393 A1 | 12/1983 |
| WO | 2022/212204 A1 | 10/2022 |

OTHER PUBLICATIONS

International Search Report and Written Opinion received for PCT Patent Application No. PCT/US2023/016490, mailed on Jun. 15, 2023, 9 pages.

(Continued)

*Primary Examiner* — Nathaniel T Woodward
(74) *Attorney, Agent, or Firm* — Workman Nydegger

(57) ABSTRACT

A measurement device, including a doppler LiDAR unit that includes an optical transmitter operable to transmit a signal, and which further includes an optical receiver operable to receive a backscatter signal that includes a portion of the signal, and the measurement device also includes a processor operable to determine a doppler shift as between the signal and the backscatter signal, and use the doppler shift to determine a volumetric flow rate of a fluid to which the signal is directed, and from which the backscatter signal is received.

39 Claims, 14 Drawing Sheets

(56) References Cited

U.S. PATENT DOCUMENTS

2020/0150001 A1* 5/2020 von Cavallar .......... G01F 1/661
2021/0356724 A1 11/2021 Semenov et al.
2022/0057242 A1 2/2022 Tokura

OTHER PUBLICATIONS

Doppler Lidar. https://www.sciencedirect.com/topics/earth-and-planetary-sciences/doppler-lidar.
Victaulic. https://www.victaulic.com/.

* cited by examiner

US 12,332,097 B2

AXIAL LiDAR DOPPLER ANALYZER

FIELD OF THE INVENTION

Embodiments of the present invention generally relate to generally relate to downhole systems, components, and methods. One or more particular embodiments are directed to an optical system configured, and operable, to measure the volumes and velocities of gases produced and/or encountered in connection with downhole operations.

BACKGROUND

The upstream oil and gas portion of a system may include various equipment located at a well site. The well site may have one or more wells, a tank battery, pipelines to sales and exhaust, or flare, power, and the well site may also include a vapor recovery unit.

In operation, hydrocarbons, such as oil and gas, along with water, flow up from the well. Once produced from the well, the oil, gas, and water may then be transferred through a pipeline, or a system of pipes, to large tank battery, that is, a group of tanks, that may be located at the wellsite. From the tank battery, the hydrocarbons may begin to separate from the water, including vapor gas that separates or is produced off the existing hydrocarbons. Oil can then be sent to a sales line, or to a more controlled separation facility located midstream where the oil may undergo another separation process. Water can be recycled or disposed. The vapor gas may travel out of the tank battery through a system of pipes that may connect to a vapor recovery unit, or to an exhaust, or flare. If a vapor recovery unit is incorporated at the wellsite, the vent gas may be recovered and sent to sales or used for a separate necessary process. If a vapor recovery unit is not incorporated at the wellsite, then the vapor may transfer through a low pressure, or high pressure, system of pipes that travel to a flare, or an exhaust, where the vapor may be burned or exhausted into the atmosphere.

The volumes and velocities of the hydrocarbons that travel through the system, or process explained above, are not recovered, or recorded. There currently is no data acquisition system that accurately records these volumes, or velocities, of hydrocarbons that travel from the well to the tank battery, from the tank battery to sales or to separation, and/or the vapor gas that is transferred to the flare, or to the vapor recovery unit.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
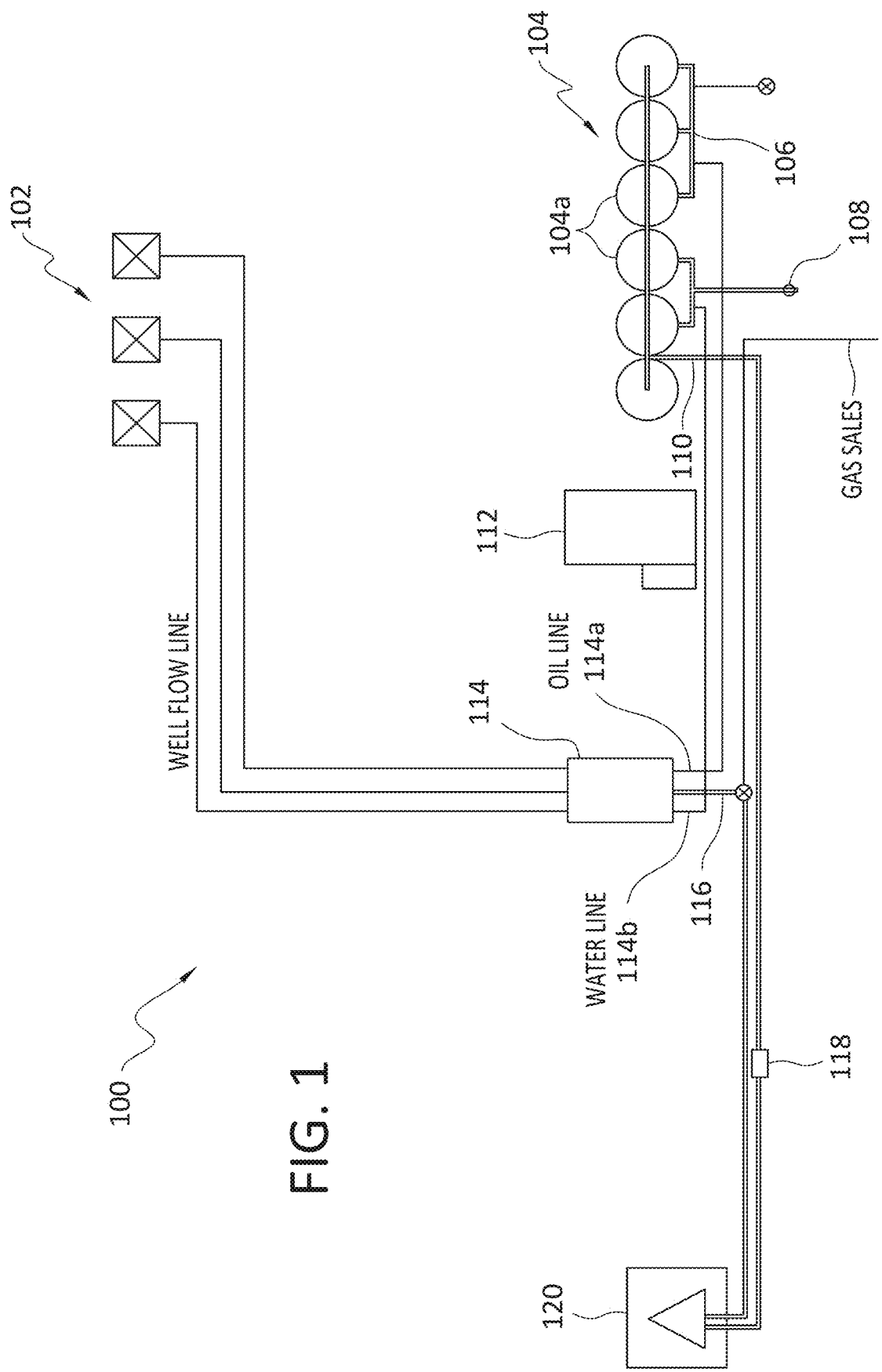
FIG. 1 is a plan view that discloses aspects of an example wellsite layout and schematic without vapor recovery unit.

Embodiments of the present invention generally relate to generally relate to downhole systems, components, and methods. One or more particular embodiments are directed to an optical system configured, and operable, to measure the volumes and velocities of gases produced and/or encountered in connection with downhole operations. While optical measuring devices exist that operate to measure flow velocities, no optical devices presently exist that are configured, or operate, to transmit a LIDAR beam axially, or parallel with flow, inside of a pipe to measure a volumetric flow rate of a fluid, liquid, gas, or solids. For this reason, at least, example embodiments may provide a significant advance over known technologies.

One example embodiment comprises an optical system suitable for use in downhole applications, namely, an Axial Optical Volumetric LiDAR Doppler Analyzer (ALDA) that may comprise, for example, an optical transmitter and receiver. The doppler LiDAR may include a transmitter, such as a laser, that generates and transmits pulses, or a continuous stream, of energy that impinges upon, or irradiates, a volume of interest. A receiver of the doppler LiDAR may collect backscattered energy, and then estimate the backscattered energy and Doppler shift of the return. In this way, the optical system may be able to measure parameters including, but not limited to, the flowrate, velocity, and volume, of fluids such as gases. These parameters, as applicable, may be measured for a flow of material, and/or for a static volume of material.

Note that as used herein, 'fluid' and 'fluids' are intended to be broadly construed and include, but are not limited to, any phase of a material, including liquids, gases, combinations of one or more liquids, combinations of one or more gases, combinations of one or more liquids and one or more gases, liquids and gases that include solid materials such as particulates, and combinations of gases and/or liquids that include particulates, and groups and combinations of any of the foregoing. A vapor, as referred to herein, is one example of a fluid.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

For example, one advantageous aspect of an embodiment is that the embodiment may provide for relatively high accuracy and turndown ratio, that is, a range of operation, relative to the limited range of operation typically associated with components such as orifice meters. As another example, an embodiment does not require compression of the fluid, whose flow rate is being measured, prior to measurement of the flow rate by the device. By way of contrast, typical orifice-based measuring devices require that the fluid be compressed in order to obtain relatively reliable measurements of flow rate. Further, an example embodiment of an ALDA may be relatively less expensive than conventional flow rate measuring devices. As a further example, an embodiment may omit the use of radioactive sources as a mechanism to facilitate flow measurements. In contrast, oilfield densitometers, for example, typically employ radioactive sources to facilitate measurements. Moreover, an embodiment may not require the use of high voltages, high temperatures, or cryogenic liquids, such as may be required by devices such as mass spectrometers, and mass spectrographs. Further, an embodiment may be configured, and operate, to transmit a LiDAR beam axially, or parallel with the direction of flow, inside of a pipe or other element to measure a volumetric flow rate of a fluid, liquid, gas, or solids, through the pipe or element. As a final example, an embodiment may be able to operate with requiring the use of flow restrictions or other devices to be placed in a fluid passageway where the embodiment is situated. Various other advantages of one or more example embodiments will be apparent from this disclosure.

A. Example Use Cases for One or More Embodiments

In general, one embodiment of the invention comprises an optical system that may be installed within the interior of the system of pipes that transfer hydrocarbons and water to a tank battery. An optical system that may be installed within the interior of the system of pipes that transfer hydrocarbons and water from the tank battery to sales, or separation. An optical system that may be installed within the interior of the system of pipes that transfer vapor or vent gas to the vapor recovery unit, or to the flare, or exhaust.

A.1 Midstream Oil and Gas Portion

The midstream oil and gas portion of a system may include, and/or involve processing, storage, and/or the transportation of hydrocarbons to refineries and/or any end user. In such environments, hydrocarbons are transferred, or transported, to the midstream systems from upstream. Once the hydrocarbons reach the midstream systems, they may go through separation processes, refining, and transportation by truck, rail, or pipeline to downstream users such as refineries. Water may also be present and may require separation from the hydrocarbons. The hydrocarbon mixture, being oil and gas, and water as the three-phase separation for midstream facilities prior to transport. The facility may include multiple systems of pipes, or other mechanisms to transport hydrocarbons, water, and other fluids and gases, throughout the midstream facility prior to transport. These systems may require measuring instrumentation, such as an embodiment of the invention, that are configured and operable to acquire data such as volumes, velocities, densities, as well as composition.

With reference to the example context of the midstream oil and gas portion of an example system, an embodiment of the invention may be configured and operable to measure volumes, velocities, densities, and composition, of fluids. An embodiment may be installed within the interior of the system of pipes that may be transferring hydrocarbons and water. An embodiment may also be installed within vessels, tanks, or any other volumes through which, and/or from which, midstream liquids are transferred. An embodiment may also be installed within the interior of a system of pipes that may lead to vent, flare, or exhaust.

A.2 Downstream Oil and Gas Portion

The downstream oil and gas portion of a system may be that portion of the system in which hydrocarbons are transferred, or transported, to/from midstream, or upstream markets, to undergo refining. The refining process may include the processes which create chemicals, gasoline, diesel, lubricants, kerosene, or any product or by-product that the end user or refiner may have the capacity to create.

The refining process of hydrocarbons may be broad and complex. Multiple stages take place within the hydrocarbon refining process. These stages may differ depending on what product is being created by the refiner, or end user. With all the steps and stages that hydrocarbons may go through during this process, waste, exhaust, and vent gas, for example, may need to be released into the atmosphere or burned off at a flare stack. Some of the waste, such as natural gas for example, may also be used to power a natural gas power plant that is used to generate power for the refinery, or any end user purchasing power from the grid.

With reference to the example context of the downstream oil and gas portion of an example system, an embodiment of the invention may be configured, and operate, to accurately acquire this data. Particularly, an embodiment may measure the volume and velocity of hydrocarbons, or refined products, that are generated or created during the refining process. An embodiment may measure the volume and velocity of exhaust gas along with the volume and dimensions of particulates that are generated and escape with the gases into atmosphere from the flare stack, or that are vented and exhausted through the stack of a natural gas power plant.

A.3 Power and Energy Industries

The power and energy industries may comprise processes for utilizing fossil fuels, natural gases, and other forms of fuel for creating energy through the combustion process, or any process that creates energy from these sources. These combustion systems may include, but are not limited to, coal fired power plants, oil fired power plants, and natural gas power plants.

A coal fired power plant may include a boiler where coal is burned, or undergoes combustion, in turn heating up the tubes that are incorporated into the walls of the boiler. These tubes are full of water which then turns to steam during the combustion, or heating, process. After the coal undergoes its combustion and burning process, its by product is ash, particulate, and hazardous gases. These gases and particulates are then vented to atmosphere through a stack. The gas volume in, and passing through, the stack, along with the dimensions and volumes of the particulate, may not always be monitored by a system.

An oil-fired power plant operates comparably to the coal fired power plant. One main difference is the fuel being used to generate heat. In this case, the fuel being combusted or burned in the boiler is oil. The combusted oil generates a by product such as combustion gas. The gas in turn may be exhausted into atmosphere through a stack. The gases that are being vented to atmosphere may not always be monitored by a system.

A natural gas fired power plant may be a Heat Recovery Steam Generator (HRSG), or a boiler where natural gas may be combusted in. The HRSG may combust natural gas, or ignite it, before or while it enters a natural gas turbine. In turn, the heat generated by the ignited natural gas then enters a boiler system before going through a series of systems prior to exhausting and being vented to the atmosphere through a stack. The natural gas volumes and velocities may not always be monitored prior to entering the natural gas turbine. The exhaust, or vented gas, that travels out the stack into atmosphere may not always be monitored by a system.

With reference to the example context of the power and energy industries, an embodiment of the invention may be configured and operable to measure the volumes and velocities of exhaust gases that are vented to atmosphere after undergoing a combustion process, such as may be performed in industries including, but not limited to, the energy, power, manufacturing, refining, oil, and gas, and automotive or transportation industries. An embodiment may also measure the volume and velocities of gases, such as natural gas for example, that enter, and/or exit, the combustion system, or process, where one example combustion system may comprise one or more natural gas turbines.

B. Overview of One or More Embodiments

One or more example embodiments of the invention comprise an optical system (an example of which is an Axial Optical Volumetric LiDAR Doppler Analyzer—which may be referred to herein simply as an 'ALDA'), that may comprise, for example, an optical transmitter and receiver. Briefly, an ALDA may include an optical transmitter, such as a laser, that generates and transmits pulses, or a continuous stream, of energy that impinges upon, or irradiates, a volume of interest, including any static or flowing fluid(s) present in the volume of interest. An optical receiver of the ALDA may collect backscattered optical energy, and then estimate the backscattered energy and doppler shift of the return.

Further information concerning aspects of a doppler LiDAR is disclosed at: https://www.sciencedirect.com/topics/earth-and-planetary-sciences/doppler-lidar, which is incorporated herein in its entirety by this reference. In more detail, the optical transmitter and receiver, according to one embodiment, may be installed within a mechanical apparatus that may include an aperture and a control board. The mechanical apparatus may be installed inside pipes, conduits, or any system through which fluids such as liquids, gases, emissions, aerosols, and/or particulates may travel.

An embodiment of the ALDA may be installed in-line so that liquids, gases, and solids, flowing in the line pass through and/or around the ALDA. In other embodiments, the ALDA may be installed in a location where the ALDA is able to measure aspects of the flow in a line even though the ALDA may not be installed in-line. In some embodiments, multiple instances of an ALDA may be installed at various locations throughout a piping system.

Depending on the embodiment, the system may be installed so that the optic is facing axially, or lengthwise through, down, or up the pipe or system in which it is in installed in. The axial facing optic may include a LiDAR (Light Detection And Ranging) system, and/or other optic, configured to transmit an optical signal. The LiDAR optic may transmit an optical signal axially down the pipe where, but not limited to, hydrocarbons such as gas, liquids, emissions, aerosols, and/or particulates are flowing through. The transmission of the optical signal may be continuous, or pulses, of energy that irradiate, illuminate, or impinge upon, the area of interest. The receiver may collect, or receive, the data as backscattered energy. The receiver may then estimate the doppler shift of the returned backscatter. The scatter may be molecules, particulates, suspended solids, or liquids, and/or aerosols.

The results, or data, collected, or derivable from, from the doppler shift and backscatter that are transmitted back to the optical receiver, may include, or enable the determination of, the volume of gases and liquids that are flowing through the system, that is, a volumetric flow rate, the dimensions and sizes of suspended solids, and/or particulates, as well as the velocity of flow through the system, and the pressure of the fluid in the system.

An embodiment of the ALDA may be configured and operable to estimate the error between the average frequency, the number of incident backscattered objects detected, such as, but not limited to, aerosols, and the bandwidth of the return. The ALDA may be configured and operable so that the transmitter has a narrow spectral width and optimal transmitted energy. Example spectral widths and wavelength ranges employed in some embodiments include spectral widths in the range of about 0.1 nm to about 2.0 nm, and any sub-range falling within that range. Wavelengths, such as generated by a transmitter, employed in example embodiments include wavelengths in the range of about 300 nm to about 1100 nm, and any sub-range falling within that range.

The ALDA may be powered by a combination of energy sources such as, but not limited to, natural gas, solar (photoelectric), thermal, fuel cells, electrical power such as from batteries, or directly plugged into electrical power supplied from an electrical power grid. The data that is collected by the ALDA may be stored internally within the ALDA, and/or be transmitted to a host by ethernet, Wi-Fi, or Bluetooth, or transmitted through a tethered cable that is connected to the ALDA. The host may comprise an HMI (human-machine interface), PLC (programmable logic controller), or CPU (central processing unit). Embodiments may include a display to display information regarding the ALDA operations.

C. Detailed Discussion of Aspects of One or More Embodiments

With reference now to the Figures, information is provided concerning aspects of one or more example embodiments of the invention. Such information is provided by way of illustration and is not intended to limit the scope of the invention in any way.

C.1 Wellsite

Turning first to FIG. 1, there is disclosed an example wellsite 100, in connection with which an embodiment may be employed. The wellsite 100 may include one or more wells 102. In general, hydrocarbons, along with water and other waste, produced up the wellbore of the wells 102 may flow in a single line to a high-pressure separation vessel, as discussed below. The wellsite 100 may further comprise a tank battery 104 that may comprise one or more tanks 104a. Oil, gas, and water, may be stored in the tank battery 104. Inside the tank battery 104, oil, gas, and water undergo further natural separation. For example, oil may be collected from the tank battery 104 and transferred by truck or line to sales. Further, water may also be collected from the tank battery 104 and transferred by truck or line to disposal. With additional residence time in the tanks 104a, additional gas comes out of solution from both the water and oil. This gas rises to the top of the tanks 104a and may be referred to herein as 'tank gas vapors.'

The wellsite 100 may further include water transfer lines 106. The water transfer lines 106 may or may not be included within the tank battery 104. The water transfer lines 106 are used to transfer water from the tanks 104a to a truck to be hauled off for disposal or treatment. A sales line 108, or line to a midstream oil and gas portion of the system, or simply 'midstream,' may be connected to the tank battery 104. The sales line 108 may be used to transfer hydrocarbons and some water to a midstream facility, or directly to sales. Also included in the wellsite 100 may be a low pressure (LP) line 110. Vapor, exhaust, and other gases, may be vented out through the top of the tank battery 104 and into the LP line 110, from which they may be transferred to a flare or VRU. A power and communication station 112 may also be provided at the wellsite 100. Power, communication, and controls, for the wellsite 100 may be located at the power and communication station 112.

With continued reference to the example of FIG. 1, the example wellsite 100 may include a high pressure (HP) vessel 114 which may comprise, or incorporate, a treater/separator. In general, the HP vessel 114 is where oil, water, and gas, are separated. Oil and water may be transferred to the tank battery 104 along with small amounts of gas that remain dissolved in the liquids in solution. High pressure gas may be transferred from the well 102 to sales or a flare stack, as discussed below. The HP vessel 114 and high-pressure lines connected to it are configured to handle higher pressure gas and liquids.

In the example configuration, three fluid lines may connect to the HP vessel 114. The first of these may be an oil line 114a, which serves to transfer the oil to the tanks 104a of the tank battery 104. Another of the three fluid lines may be a water line 114b. The water line 114b serves to transfer water to the tanks 104a of the tank battery 104. A third line (not shown) may comprise an HP line for gas sales or flare. This HP line may serve to transfer water to sales or to a flare, an example of which is discussed below. In system upset situations, liquids could be sent to the flare by way of the this third line.

As shown in FIG. 1, the wellsite 100 may further include an HP line 116 connected to the HP vessel 114. The HP line 116 serves to transfer high pressure liquids, or gas, to a flare stack. The wellsite 100 may also include one or more knockouts 118. The knock-out 118 may be provided so that liquids and/or solids that fall out of the flow path can drop out of the gas as it travels to a flare stack 120. There may be a knockout 118 located on both the HP lines and LP lines of the wellsite 100.

Finally, the wellsite 100 may include a flare stack 120. The flare stack 120 may be the final disposition for the gas and tank vapor gas. At the flare stack 120, gases may be burned, or vented to atmosphere in small quantities. There may be two flares in the flare stack 120, one for LP tank vapors, and one for the HP line 116.

C.2 LP/HP Schematic from Knockout to Flare Stack, without VRU

Figure 2:
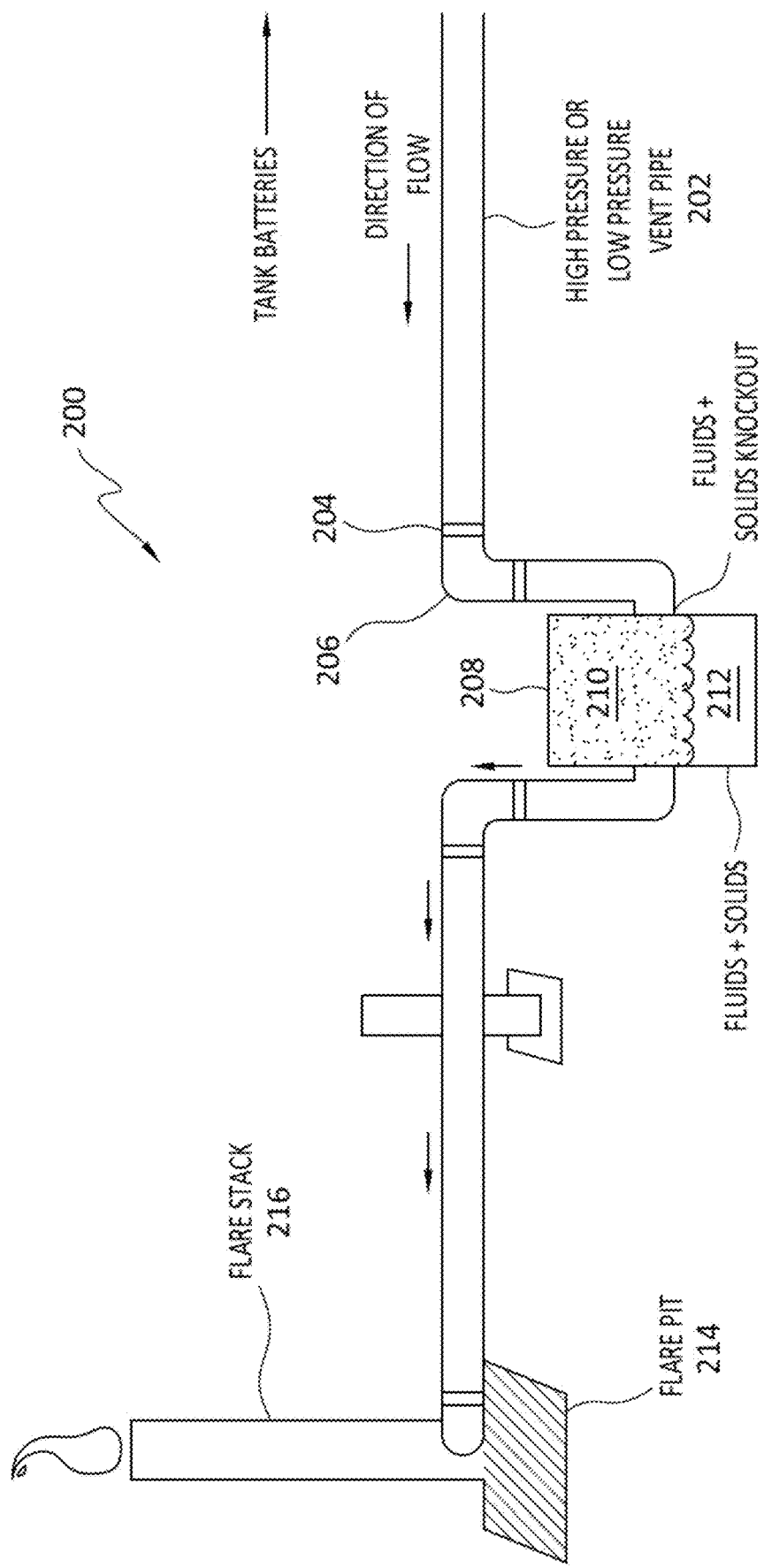
FIG. 2 is an elevation view that discloses an embodiment of low pressure or high pressure piping schematic from knockout to flare stack without vapor recovery unit.

FIG. 2 discloses an example LP/HP system 200. Except as may be noted, the components in FIG. 2 may be similar or identical to the components discussed in connection with the other Figures.

In the example of FIG. 2, a line 202, which may serve as either, or both of, an LP line or an HP line, may be provided. The line 202, when serving as an LP line, may be used to receive vapor and vent gases escaping from the top of a tank battery (see FIG. 1). The line 202, when serving as an HP line, may operate to transfer high pressure liquids, or gas, to transfer to a flare stack. Note that as used herein, 'low' and 'high' pressure are not limited to any particular pressure, or range of pressures. An example of a low pressure is about 0.01 oz/psi, and an example of a high pressure is about 30,000 psi.

With continued reference to FIG. 2, the LP/HP system 200 may comprise one or more couplings 204 that connect pipe, tube, and fittings, together. Example couplings which may be employed in an embodiment include those sold under the VICTAULIC® mark (https://www.victaulic.com/), such as rigid couplings. Any of the couplings referred to herein may comprise a VICTAULIC® coupling. Flanged connections may alternatively be used. Various pipe fittings, such as elbows 206 for example, may be employed, and may comprise welded or flanged connections, for example. A knockout 208 may be provided where liquids and/or solids can fall out of the flow path and drop out of the gas as it travels to a flare stack. As shown, aerosols and suspended particulates/solids, all collectively denoted at 210, may be present in the knockout 208 at times. Note that the various materials 210 may, in an embodiment, cause the creation of backscatter energy that may be detected by an optical receiver of an embodiment of an ALDA. The knockout 208 may also hold various liquids 212 at times. These may be liquids that may have fallen out of suspension in the system and are now contained in the knock-out 208.

The example LP/HP system 200 may comprise, or connect to, a flare pit 214. In general, the flare pit 214 may contain the flare and create a barrier for safety purposes. The flare pit 214 may be positioned beneath a flare stack 216. The flare stack 216 may be the final system through which the exhaust, or vent, gas passes before transferring into the atmosphere. The flare stack 216 is where gases may be burned and vented to atmosphere.

C.3 Aspects of an Example Embodiment of an ALDA

Figure 3:
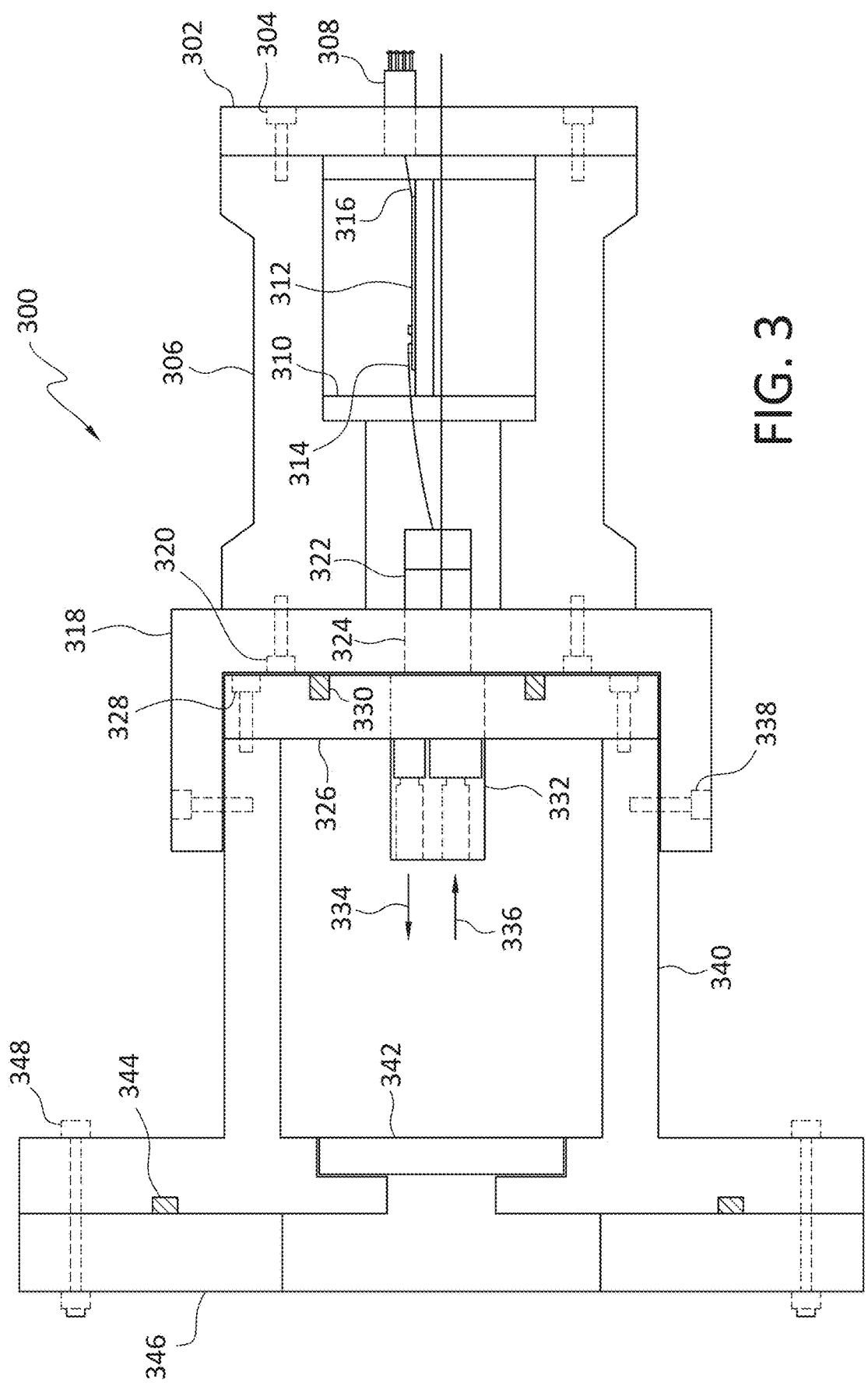
FIG. 3 discloses aspects of an optical volumetric LiDAR Doppler Analyzer (ALDA) according to one embodiment.

With attention now to FIG. 3, there is disclosed an example optical volumetric LiDAR Doppler Analyzer (ALDA) 300, according to one embodiment of the invention. The example ALDA 300 may comprise a variety of components, example embodiments of which are discussed in turn below.

C.3.1 Mechanical

As shown in FIG. 3, the ALDA 300 may comprise a board encloser cap 302. The board encloser cap 302 may be fastened, such as with board enclosure fasteners 304, to a board encloser housing 306 that includes an electrical connector 308, and conformed to the rear of the board encloser housing 306. The board encloser cap 302 may have ports, or machined pathways therethrough that enable instrumentation, connectors, plugs, or fittings, to be incorporated within the board encloser cap 302.

The material(s) used for manufacturing the board encloser cap 302 may comprise, but are not limited to, aluminum, manganese, zinc, or other bronze alloys, as well as nickel alloys and combinations of nickel with materials such as iron, chromium, copper, or molybdenum, and also stainless steel alloys and combinations of nickel, copper, or manganese, as well as aluminum alloys and combinations of zinc, copper, or iron, as well as other materials such as iron, titanium, polymers or plastics, carbon fiber, and tin. In terms of its manufacture, the board encloser cap 302 may be cast, machined from solid material, or 3D printed or manufactured through a process such as additive manufacturing.

As noted the board enclosure fasteners 304 may be used releasably fasten the board encloser cap 302 to the board encloser housing 306. The board enclosure fasteners 304 may or may not be the same/similar material as the board encloser cap 302.

The electrical connector 308 may be used to connect power, communication, and control, signals from the ALDA 300 to a host, or to other external sources such as, but not limited to, a PLC, HMI, or CPU. The electrical connector 308 may be hermetically sealed to the board encloser cap 302, or sealed using epoxy to metal bond, or by the incorporation of a polymer or plastic seal around the OD of the electrical connector 308, or the ID of a board encloser housing 306 interface for the electrical connector 308. In an embodiment, the electrical connector 308 may include an antenna to enable remote communication between the ALDA 300 and other systems and devices including a host, such as by way of Bluetooth and/or Wi-Fi communication.

The board encloser housing 306 may contain a CPU, control board, PCBs (printed circuit boards), chassis, and multiple machined, cast, or 3D printed, interfaces to allow for the implementation of components within the body of the board encloser housing 306. The material used for manufacturing the board encloser housing 306 may comprise aluminum, manganese, zinc, or other bronze alloys, as well as nickel alloys or combinations of nickel with materials such as iron, chromium, copper, and molybdenum, as well as stainless steel alloys and combinations of nickel, copper, and manganese, and also aluminum alloys and combinations of zinc, copper, and iron, and other materials may also include iron, titanium, polymers and plastics, carbon fiber, and tin. The board encloser housing 306 may be cast, machined from solid material, or 3D printed or manufactured through a process such as additive manufacturing.

With continued reference to FIG. 3, the example ALDA 300 may include a board chassis 310. The board chassis 310 may be configured and operable to contain the CPU, PCB, or any other board(s) needed to implement the instrumentation that may be incorporated into the ALDA 300. One example of such a board is a control board 312. In an embodiment, the control board 312 may be a flat and insulated surface that may have switches, meters, diodes, memory devices, data storage devices, transistors, processors, dials, or any microchip necessary to manage the controls, communications, and storage for the electrical components and devices associated with the ALDA 300.

C.3.2 Optical

As shown in FIG. 3, the ALDA 300 may include various optical components and optical interfaces of various types. For example, a pigtail connector 314 may be provided for connection of optical components to a board, such as the control board 312. In particular, the pigtail connector 314 may connect an optical transmitter and an optical receiver, discussed below, to the control board 312. Another pigtail connector 316 may be provided that connects the control board 312 to the connector, or antenna, that sends/receives data to/from a host server or other system that communicates with the ALDA 300.

A board encloser flange 318 may be provided that may be used to connect the board encloser housing 306 to an optic encloser, an example of which is discussed below. The board encloser flange 318 may be fastened, pinned, or fused such as by welding or brazing, to an optic encloser. The board encloser flange 318 may also have a seal incorporated into the conforming, or mating, surface that mates with an optic encloser. The seal may be, for example, polymer, ceramic, or metal to metal bond seal created by the torque applied to fasteners.

The board encloser flange 318 may be manufactured such that it is one piece with the board encloser housing 306, which may eliminate the need to fasten the board encloser flange 318 to the board encloser housing 306. The material used for manufacturing the board encloser flange 318 may comprise aluminum, manganese, zinc, and other bronze alloys, as well as nickel alloys or combinations of nickel with materials such as iron, chromium, copper, and molybdenum, as well as stainless steel alloys or combinations of nickel, copper, and manganese, and other materials may include aluminum alloys and combinations of zinc, copper, and iron, while other materials may also include iron, titanium, polymers or plastics, carbon fiber, and tin. The board encloser flange 318, and any other metal, or plastic, components disclosed herein, may be cast, machined from solid material, or 3D printed or manufactured through a process such as additive manufacturing. The board enclosure flange 318 may be connected to the board encloser housing 306 with one or more fasteners 320.

As shown in FIG. 3, an optic connector 322 may be provided that connects the electrical cabling, or pigtail connector 314 to an optical transmitter and optical receiver. This optic connector 322 may be soldered in place and be a permanent fixture, or may also be connected using a plug connection. The optic connector 322 may include connections for conveying power, communication signals, and control, signals. As well, an optic casing 324 may be included that has a surface that interfaces with the board encloser flange 318. This surface may be hermetically sealed, encompassed with O-rings or gaskets style seals, bonded to the metal by crush or torque applied to a thin metal washer, or epoxy bonded to the metal or material that the board encloser flange 318 is made from. This interface may hold an optical transmitter and optical receiver, discussed below, in place such that they are concentric with a window, or area of interest by way of which the optical receiver may collect and record data, such as backscatter information.

An optic encloser cap 326 may mate up with an optic encloser, an example of which is discussed below, and may be fastened, pinned, fused to the optic encloser. The optic encloser cap 326 may slide off of an optical transmitter and optical receiver once those components are installed and sealed into the board encloser flange 318. The optic encloser cap 326 may have a seal incorporated so that no external contaminants enter the optic encloser. The optic encloser cap 326 may have passageways, through ways, or multiple interfaces machined or 3d printed into its surface, other than the optical transmitter and receiver throughway, to enable additional instrumentation or components to interface with the ALDA 300 or assist in its operation. Such instrumentation and components that may be incorporated into the optical encloser cap 326 may include, but are not limited to, temperature sensors, a heating element, coolant systems, and pressure transducers. One or more optic encloser fasteners 328 may be provided that may be used fasten the optic encloser cap 326 to an optic encloser, one example of which is discussed below.

The material used for manufacturing the optic encloser cap 326 may be aluminum, manganese, zinc, or other bronze alloys, as well as nickel alloys and combinations of nickel with materials such as iron, chromium, copper, and molybdenum, or may comprise stainless steel alloys and combinations of nickel, copper, and manganese, as well as aluminum alloys and combinations of zinc, copper, and iron, and other materials may include iron, titanium, polymers or plastics, carbon fiber, and tin. The optic encloser cap 326 may be cast, machined from solid material, or 3D printed or manufactured through a process such as additive manufacturing.

An optic encloser seal 330 may be provided that may keep contaminants from entering the ALDA 300. The optic encloser seal 330 may be made from polymers or plastics, ceramic, or epoxy bond. Example optic encloser seal 330 include, but are not limited to, O-rings. In general, herein, components to be connected together may be configured so that line pressure is exerted on the components in such a way as to maintain the components in a fluid-tight engagement with each other until the line pressure is released.

As noted earlier, an embodiment of the ALDA 300 may include an optic encloser 332 which may house, among other things, an optical transmitter 334 and an optical receiver 336. The optic encloser 332 may be configured and operable to incorporate goggles, or small narrow tunnels through which the optical transmitter 334 may transmit a beam, and a small tunnel through which backscatter may be received by the optical receiver 336. The transmission of a beam by the optical transmitter 334, and reception of backscatter signals by the optical receiver 336, are indicated by respective arrows in FIG. 3. In an embodiment, lenses, collimators, and other passive optical devices, may be incorporated into the optic encloser goggles.

With continued reference to FIG. 3, the optical transmitter 334, may be located within the optic encloser 332 and may be configured and operable to transmit a beam, or laser beam, or other optical signal. This beam may be of any color such as red, yellow, blue, green, or orange. The color of the laser beam may be changed based on the application. To illustrate: green lasers, which may emit a signal that remains coherent over long distances, may be used in low visibility or dark applications; red lasers may be used in low wavelength and short distance applications; and blue lasers have shorter wavelengths, but may be used in applications that require relatively higher resolution. In general, example embodiments may employ any electromagnetic signal transmitter that is able to transmit a signal within the electromagnetic spectrum may be used to enable fluid volume measurements to be made of still/moving fluid. Thus, embodiments are not limited to the use of lasers.

In general, when a beam transmitted by a transmitter of the ALDA 300 hits a moving target, such as fluid moving towards or away from the ALDA 300, the specific wavelength of the resulting backscatter, or reflected light, created from the target will change, or shift, to be higher, or lower, depending on the circumstances, than the wavelength of the initial beam that was transmitted. This may be given by the formula: $f=(c \pm vr c \pm vs)fo$—where, C is the amplitude of the wave in the medium; vr is the speed of the receiver relative to the medium (positive if the receiver moves towards the source and negative if it moves in the opposite direction) vs is the velocity of the source relative to the medium (positive if the source moves away from the receiver and negative if it moves in the opposite direction) f is the frequency observed, and f0 is the frequency emitted. Note that frequency $(f)=1/T$ (period-time for a single oscillation), and speed v of a wave is the distance traveled by a wave per unit time (or $\lambda/T$), thus $v=f \cdot \lambda$.

The optical receiver 336, which may comprise a detector such as a photodiode or photo multiplier for example, may be located within the optic encloser 332 and is configured and operable to receive backscatter energy and, based on the fraction of (backscatter energy (received by the optical receiver 336)/transmitted energy (transmitted by the optical transmitter 334)) convert the fractional information to an electrical signal which may be used, in turn, to estimate the doppler shift of the returned data.

In more detail, LiDAR (Light Detection and Ranging) with a Doppler shift may be used to measure flow rates by detecting the movement of particles in a fluid or gas. The Doppler effect refers to the change in frequency of a wave, in this case, a laser beam, that occurs when there is relative motion between the source of the wave and the observer. When a laser beam is directed at a fluid or gas, the particles within the fluid or gas will scatter the light in different directions.

By analyzing the frequency shift of the scattered light, the LiDAR can determine the velocity of the particles. This velocity can then be used to calculate the flow rate of the fluid or gas. Specifically, the LiDAR measures the Doppler shift of the backscattered laser light by comparing the frequency of the scattered light to the frequency of the transmitted light.

In the case of measuring flow rates, the LiDAR will typically be positioned so that the laser beam is directed axially, that is, generally parallel to the direction of the flow. This allows the LiDAR to detect the velocity of the particles moving in the flow. By measuring the velocity of a large number of particles over time, the LiDAR can then calculate the average flow rate of the fluid or gas.

In an embodiment, one or more fasteners 338 may be used to connect the board encloser flange 318 to an optic encloser 340. The optical encloser 340 may be configured and operable to contain and house, components such as the optical transmitter 334 and the optical receiver 336, as well as a window 342 that is transparent to optical signals. The optical encloser 340 may also be configured and operable so that it interfaces directly with the surface of the opening, pipe, encloser, or area where the ALDA 300 may be transmitting and receiving data. The optical encloser 340 may also contain other instrumentation such as, but not limited to, temperature sensors, heating element, coolant systems, and pressure transducers.

The material used for manufacturing the optical encloser 340 may be, but not limited to aluminum, manganese, zinc, and other bronze alloys, as well as nickel alloys or combinations of nickel with materials such as iron, chromium, copper, and molybdenum, while other materials include stainless steel alloys and combinations of nickel, copper, and manganese, or aluminum alloys and combinations of zinc, copper, and iron, and also other materials such as iron, titanium, polymers and plastics, carbon fiber, and tin. The optical encloser 340 may be cast, machined from solid material, or 3D printed or manufactured through a process such as additive manufacturing.

As noted, the optical encloser 340 may be fitted with a window 342. The window 342 may be configured in any suitable shape and size. The window 342 may be incorporated into the ALDA 300 to allow the transmitter beam to pass through, and to enable the backscattered energy, comprising one or more optical signals, to return to the optical receiver 336. The window 342 may also be incorporated with electrodes, or a heating element, that is configured and operable to keep the window 342 from fogging and to help ensure that condensate does not build up on the window 342 surface. A coating may also be added to the surfaces of the window 342 to help prevent condensates and fog from building up on the surface of the window 342. The window 342 material may be sapphire, glass, laminated, chromatic, annealed, poly vinyl butyral, or resin. The window 342 material may be heat strengthened, tempered, or insulated.

With continued reference to FIG. 3, the ALDA 300 may comprise a flange seal 344, which may take the form of an O-ring for example, to ensure that no contaminants escape from, or enter, the ALDA or 300. An adapter flange 346 may allow the ALDA 300 to be installed onto a pipe, encloser, or any opening that leads to a source from within which the ALDA 300 may be needed to collect data. The adapter flange 346 may be incorporated into the system or equipment to which the ALDA 300 is to be connected. The flange seal 344 may seal the adapter flange 346 to the optical encloser 340, and the adapter flange 346 and the optical encloser 340 connected together by flange fasteners 348. Finally, the adapter flange 346 may define an aperture 350 or other opening positioned for optical communication with the window 342 so as to enable optical signals to pass back and forth through the adapter flange 346.

C.4 ALDA (Field Assembled)

Figure 4:
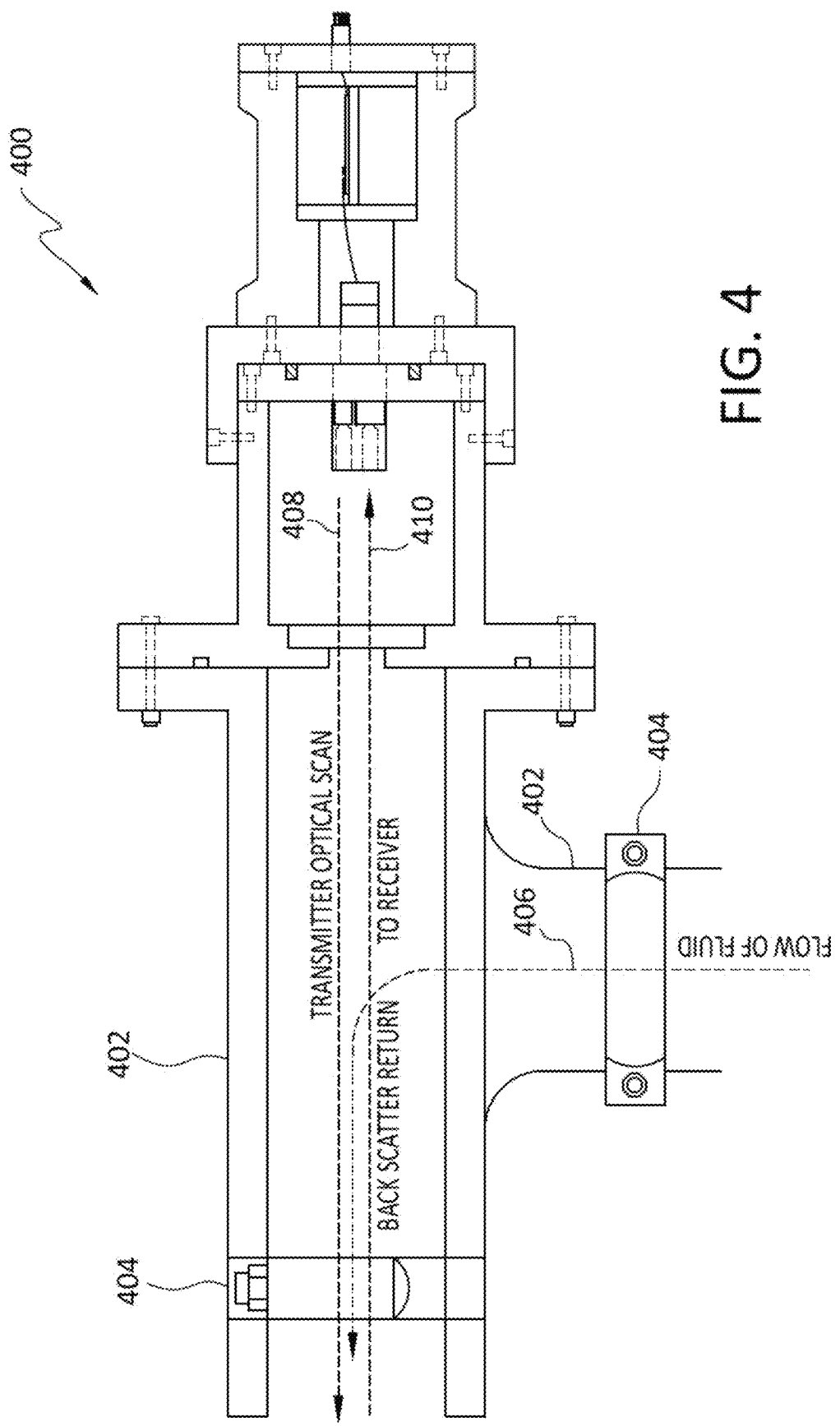
FIG. 4 discloses aspects of an example ALDA that has been field assembled.

With reference now to FIG. 4, there is disclosed an example ALDA 400 assembled and installed onto a fitting 402, such as a T-fitting for example, although the ALDA 400 may be installed, more generally, on any pipe or fitting with which the ALDA 400 is able to mechanically connect. Unless otherwise noted, the ALDA 400 may be similar, or identical, to the example ALDA 300 disclosed in FIG. 3, and discussed above.

Once installed, the ALDA 400 may be powered on and ready to start transmitting its beam down the pipe, that is, axially with respect to the pipe. The ALDA 400 may be installed to transmit its beam with the flow of the gases and emissions, or against the flow of gases and emissions. The ALDA 400 may be configured and operable to incorporate an adapter flange that may allow the ALDS 400 to be installed on a variety of different sized pipes, and emission and exhaust systems. The ALDA 400 may be configured and operable so that it may be installed within the pipe, eliminating the need to monitor the gases, liquids, emissions, or exhaust those gases, liquids, and emissions, have escaped to atmosphere, or otherwise pass out of the pipe.

In an embodiment, the T-fitting 402 may be connected to another component by way of a coupling 404. In general, the component or fitting may direct and/or changes the direction of fluid flow through a system. The elbow, or T section, may enable the ALDA 400 to be installed into a system. In the example of FIG. 4, the ALDA 400 may be attached to the T-fitting 402 in the same, or a similar, way as the ALDA 300 may be attached to the adapter flange 346, as shown in FIG. 3. With continued reference to the example of FIG. 4, the direction of flow 406 is the direction that one or more fluids, such as gas, vapor, emission, and exhaust, is flowing in a fluid conduit such as a pipe.

As shown in FIG. 4, an optical transmitter of the ALDA 400 may transmit a beam or optical signal 408, or performs an optical scan down the pipe, that is, in a direction that is parallel to the direction of flow, or within a range of about 0 degrees to 10 degrees offset from the direction of flow, in one embodiment. Performance of an 'optical scan,' as used herein, may involve transmission of an optical signal, such as by a laser or other optical transmitter. In more detail, optical scanning includes a process of using a scanning device, such as a scanner or a LiDAR, to capture an image or data from an object using light. This may be done by directing an optical signal onto the object and measuring the reflection or absorption of the light. The reflected or absorbed light may then be detected by a sensor, and the resulting data may be used to create an image or capture information about the object.

In an embodiment, the beam color of an optical signal may be red, green, yellow, orange, or blue, for example. The optical transmitter may transmit a beam and perform an optical scan in the direction of flow 406, or against the direction of flow 406. The optical transmitter beam may be configured with a narrow spectral width, high coherence, with maximum transmitted energy to generate more precise and accurate surveys and measurements. As further indicated in FIG. 4, backscatter 410, resulting from the reflection of an optical signal by materials in the pipe, may return to the optical receiver. Backscatter 410 may comprise high energy level electrons, or photons, that may be generated by scattering events created by incident electrons within the transmitter beam.

C.5 Knockout to Flare Stack (Field Assembly View)

Figure 5:
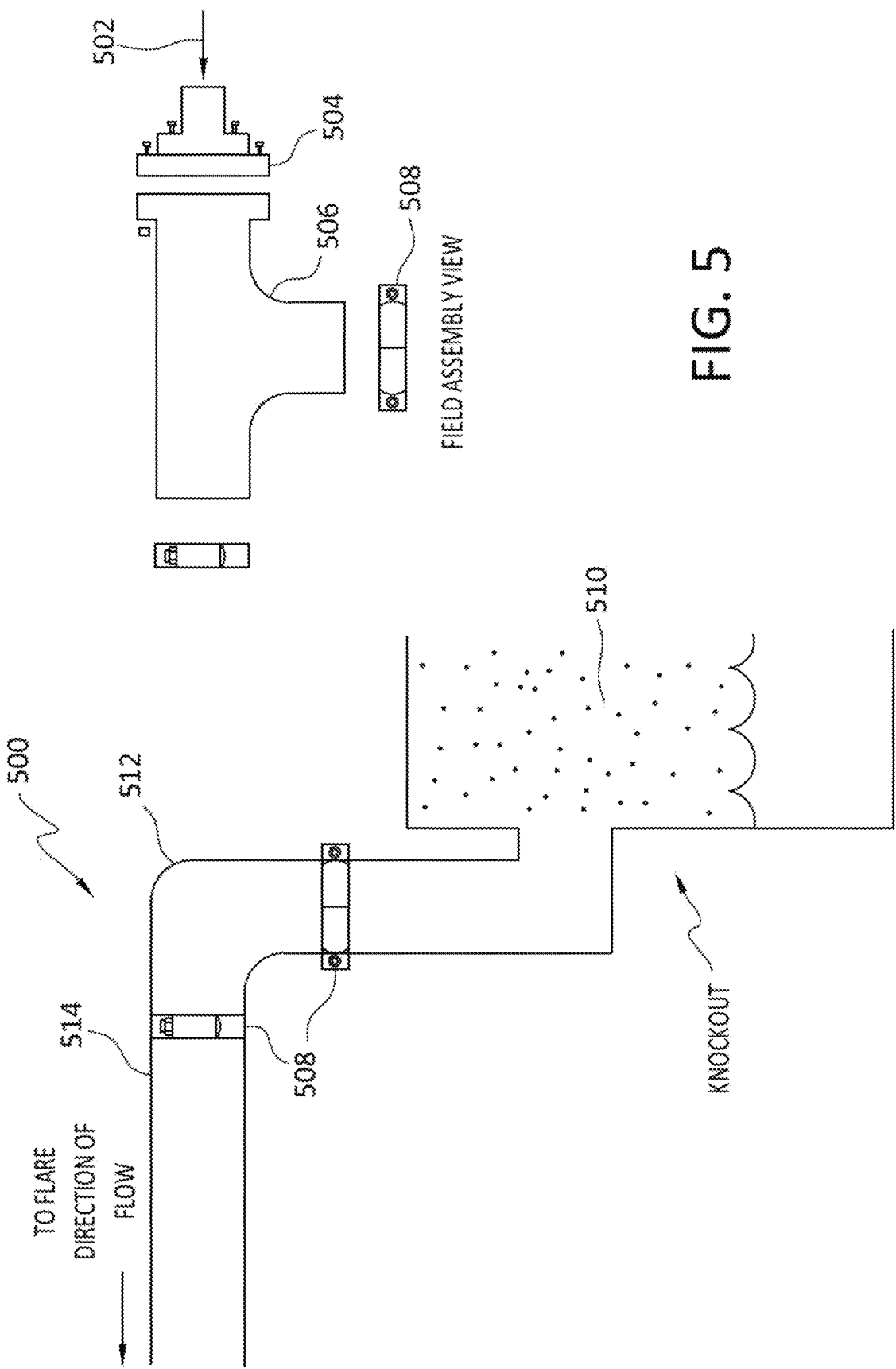
FIG. 5 discloses a schematic of an example system including a knockout and flare stack field assembly view.

FIG. 5 discloses a section 500 of an exhaust system that comprises a knockout and a pipe for gases and emissions to flow through. FIG. 5 discloses a pre-assembly representation where an elbow section of a piping system may be replaced with a T section of pipe that allows an ALDA 502 to be installed. Particularly, an adapter flange 504 may enable the ALDA 502 to be connected to a pipe, or any other component 506 carrying, or leading to, fluid(s) from which the ALDA 502 may collect data. In the example of FIG. 5, the component 506 comprises a T-fitting, but may alternatively comprise an elbow fitting. In general, fittings such as elbows and T-fittings may direct and/or change the direction of flow of a fluid through the system. The component 506 may be connected to another component by way of one or more couplings 508.

The example section 500 may comprise a knockout 510. The knockout 510, which may be installed at, or define, a low point in the section 500 or other system, may act as a phase separator that serves to separate oil, water, and gas. The knockout 510 may implement a three-phase separation where liquids and solids fall out to the bottom of the knockout 510, and the gases, aerosols, or suspended solids stay in the flow stream and may then, downstream of the knockout 510, be exhausted, vented, flared, or captured by a VRU, for example.

The example section 500 may further comprise an elbow 512 connected in the section 500 by couplings 508. The elbow 512 may serve to direct the flow of the emission, exhaust, or gases, from the knockout 510 to the flare or VRU. Finally, the example section 500 may comprise a pipe 514. The pipe 514 may comprise an LP, or HP, pipe, depending upon on the vapor pressure and/or rate that gases or liquids flow through the piping system that includes the section 500.

C.6 Knockout to Flare (Elevation View Assembled)

Figure 6:
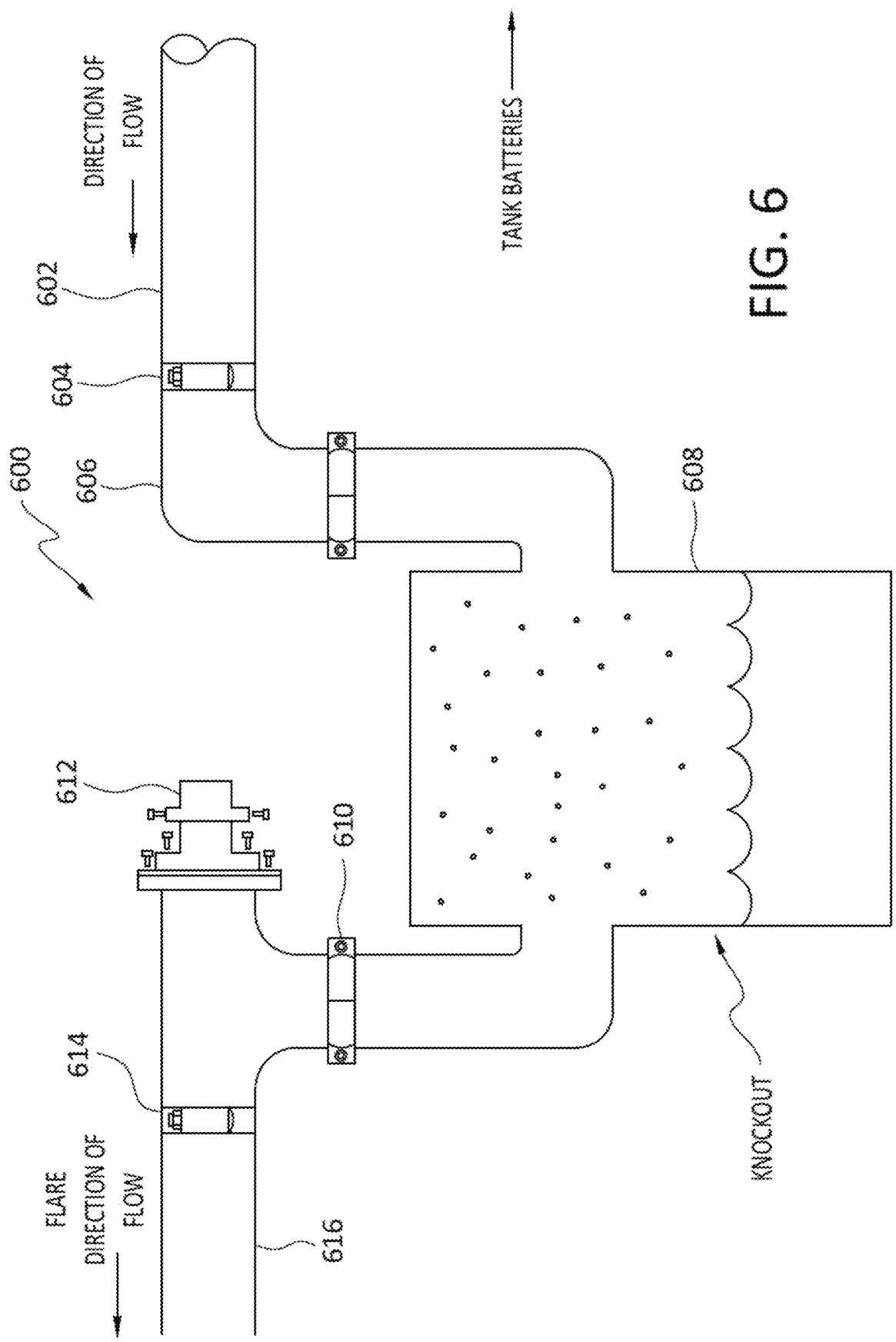
FIG. 6 discloses an elevation view schematic from an example knockout to flare stack, assembled.

FIG. 6 discloses an example section 600 of an exhaust system, where an elbow has been replaced by a T-section and an ALDA (compare example of FIG. 5). The example section 600 may comprise a pipe 602 which may carry HP or LP materials, depending upon the vapor pressure and/or rate that gases or liquids flow through the piping system that includes the section 600. A coupling 604 may connect the pipe 602 to an elbow 606. The elbow 606 may comprise a pipe fixture that directs the flow of the emission, exhaust, or gases from a source, such as the source of combustion, a tank battery, or the well(s) to a knockout 608.

The knockout 608 may act as a phase separator, and may separate oil, water, and gas. The knockout 608 may implement a three-phase separation where liquids and solids fall out to the bottom of the knockout 608, and the gases, aerosols, or suspended solids stay in the flow stream and may then be exhausted, vented, flared, or captured by a VRU, for example. A coupling 610 may connect the knockout 608 to a T-fitting of an ALDA 612. The ALDA 612 may, in turn, by connected by another coupling 614 to a pipe 616. The pipe 616 may comprise an LP, or HP, pipe, depending upon on the vapor pressure and/or rate that gases or liquids flow through the piping system that includes the section 600.

C.7 Alternate Installation Option for ALDA

Figure 7:
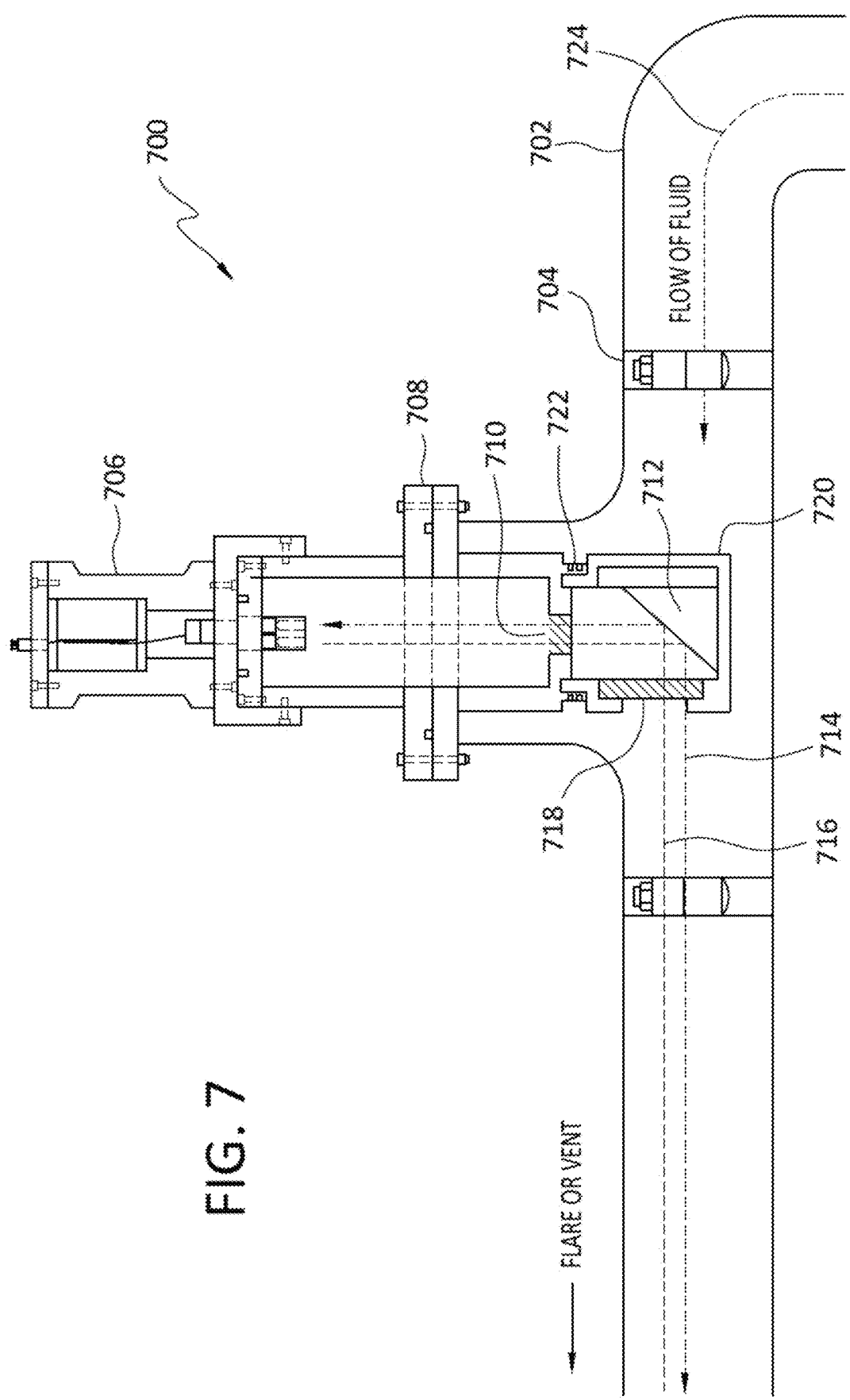
FIG. 7 discloses an example secondary installation option for an example optical volumetric ALDA.

With attention now to FIG. 7, there is disclosed an alternative approach for installing an ALDA within a gas, or emissions, system. This example system 700 may be installed from either side of the pipe. The ALDA installed may have a prism, or reflector, incorporated within the system that may be angled at 45 degrees to allow for a 90-degree transmission of energy to and from the transmitter. The prism, or reflector, may also be configured and operable to tilt or be steered or turned by a motion device to allow for optimal direction or redirection of an optical beam. The use of a prism or reflector may enable transmission of an optical signal, by an optical transmitter of the ALDA, either with, or against, a direction of flow.

As shown in FIG. 7, the example system 700 may comprise a pipe 702, which may convey high pressure fluids, low pressure fluids, exhaust, or other emissions, depending on the application. The pipe 702 may be connected by a coupling 704 to an ALDA 706. The ALDA 750 may comprise an adapter flange 708 that may enable the ALDA 706 to be installed onto a pipe, fitting, or other component, through which a fluid flows from which the ALDA 706 may be used to collect data. The adapter flange 708 may define an aperture 710 through which optical signals can pass.

The example system 700 may comprise a prism 712, configured and arranged to direct, or redirect, a beam transmitted by an optical transmitter. The prism 712 may further be configured to direct or redirect a backscattered energy beam from the source to which the optical transmitter is directing the beam or optical signal, back to an optical receiver. The prism 712 may be configured and operable to rotate, spin, turn, or otherwise undergo a change in position/orientation, so as to direct, and/or redirect, an optical signal or optical beam, regardless of the source or direction of travel of the optical signal or optical beam. The prism 712 may be made of any suitable materials, such as glass or silicates for example, and may be coated. In an embodiment, one or more mirrors may be used in place of the prism 712.

With continued reference to FIG. 7, an optical transmitter of the ALDA 706 may transmit a beam 714 through the aperture 710 to the prism 712. The prism 712 then directs the beam 714 in the direction of flow, or axially, to radiate lengthwise down the pipe. The beam color may be red, green, yellow, orange, or blue, for example. The optical transmitter may transmit its beam 714 and perform an optical scan in the direction of flow, or against the direction of flow. The optical transmitter beam may be a narrow spectral width with maximum transmitted energy to generate more precise and accurate surveys and measurements.

The beam 714 may be scattered by fluids and/or solids in the pipe. Thus, a backscatter optical signal 716 may be generated and returned to the optical receiver of the ALDA 706. The backscatter signal, or simply 'backscatter,' may comprise high energy level electrons, or photons, that may be generated by scattering events created when electrons reflected by the fluids or solids in the pipe, are incident upon electrons in the beam generated by the optical transmitter. The backscatter signal returns through a window 718 and is then directed, by the prism 712$m$ through the aperture 710 and back to the optical receiver.

The window 718 may be any suitable shape or size. The window 718 may be incorporated into the ALDA 706 to enable the optical transmitter beam to pass through, and enable the backscatter optical signal to return to the optical received of the ALDA 706. The window 718 may also comprise electrodes, or a heating element, configured and operable to keep the window 718 from fogging and ensure that condensate does not build up on the window 718 surface. A coating may also be added to the surfaces of the window 718 to assist in keeping the condensates and fog from building up on the window 718 surface. The window 718 material may comprise sapphire, laminated glass, chromatic glass, annealed glass, poly vinyl butyral, or resin. The window 718 material may be heat strengthened, tempered, or insulated.

The window housing 720 may be configured and operable to house the window 718, prism 712, temperature sensors, pressure sensors, or any instrumentation that may be required for operation of the ALDA 706. The window housing 720 may also have motors, gears, or mechanisms configured to change the position and orientation of the prism 12. For example, a motor may be used to turn or steer the prism 712 to direct or redirect an optical signal. The window housing 720 may be integrated as a unit with the ALDA 706, or may be implemented as a separate component that is fastened to, or connected with, the ALDA 706.

The material for the window housing 720 may be aluminum, manganese, zinc, or other bronze alloys, as well as nickel alloys and combinations of nickel with materials such as iron, chromium, copper, and molybdenum, and other materials may include stainless steel alloys and combinations of nickel, copper, and manganese, as well, aluminum alloys and combinations of zinc, copper, and iron, while other materials may also include iron, titanium, polymers and plastics, carbon fiber, and tin. The window housing 720 may be cast, machined from solid material, or 3D printed or manufactured through a process such as additive manufacturing.

Note that any other element configured and operable to direct an optical, or other electromagnetic, signal may be employed in embodiments of the invention. Thus, embodiments of the invention are not limited to the use of a prism 712. Other embodiments may employ, for example, one or more mirrors to direct a signal.

The example system 700 may include an ALDA-to-housing connection 722. The ALDA-to-housing connection 722 may be fastened with fasteners such as bolts and screws. The ALDA-to-housing connection 722 may also be connected by a sleeve, collar, pin(s), fused, or by interference fit.

Finally, in the example of FIG. 7, a fluid flow 724 may pass through the example system 700 in the direction indicated. In general, the direction of flow is the direction that one or more fluid(s) such as gas, vapor, emission, or exhaust, is flowing.

C.8 Example ALDA Operations

Figure 8:
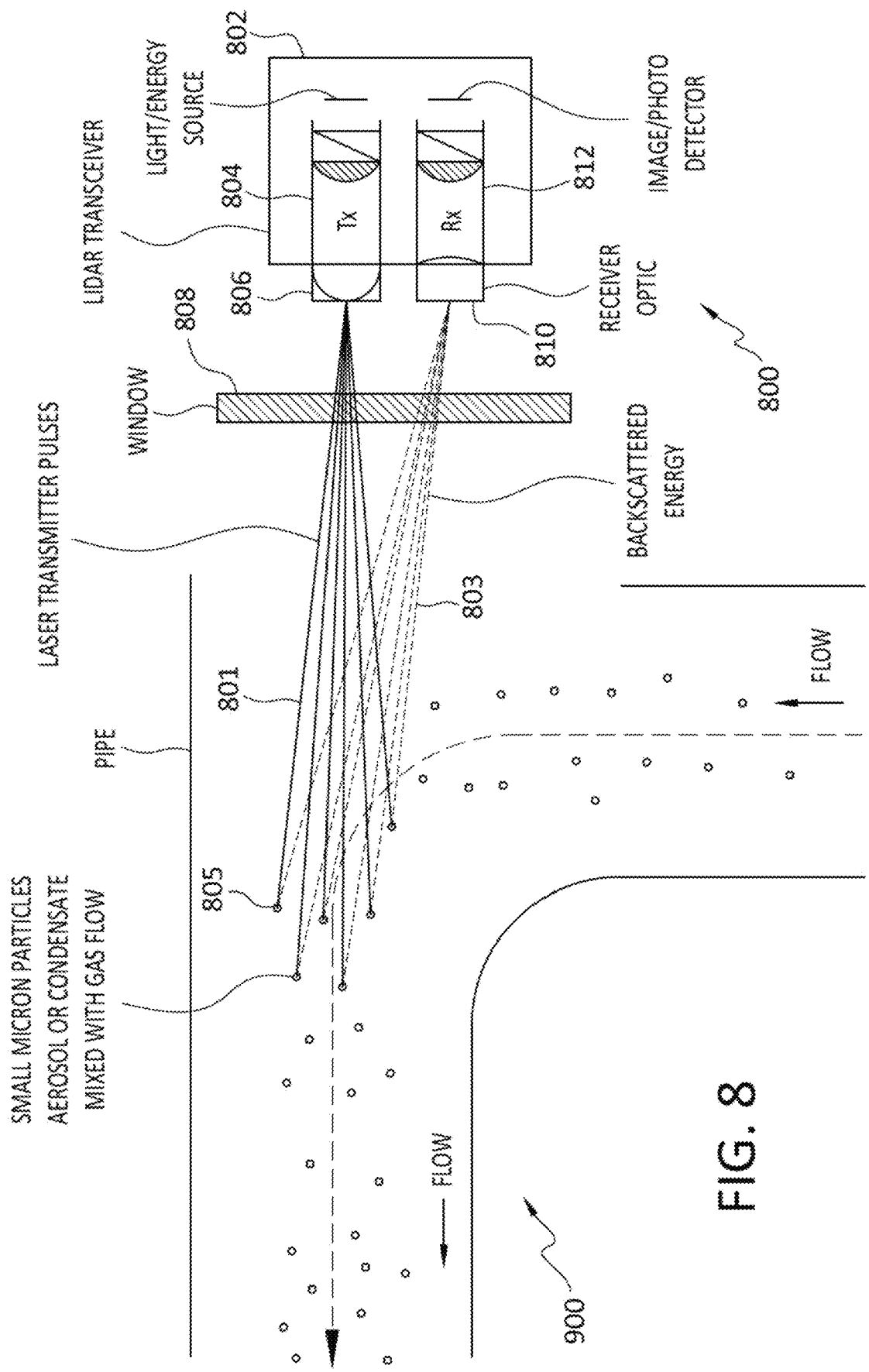
FIG. 8 discloses aspects of the operation of an example optical volumetric ALDA.

FIG. 8 discloses an example ALDA system 800 installed within an exhaust system 900 that focuses on the operation of the ALDA. This is presented by way of illustration, and is not intended to limit the scope of the invention.

In general, the particular example of FIG. 8 discloses a transmission, by an optical transmitter, of a beam 801 axially down the pipe. The pipe has a direction of flow flowing up toward, and then away from, the ALDA 800. The flow of gas comprises small particulates, aerosols, or suspended solids suspended and flowing within the gas or emissions flow stream. The beam 801 may hit, or contact, the particles flowing through the system and the data from that contact may be returned to an optical receiver as backscattered energy 803. The optical receiver may then estimate the backscattered energy and doppler shift of the return. This returned data may be transmitted to a CPU where the data is then analyzed. The captured data may comprise an accurate measurement of the volume of gas, or emissions, that are flowing through the system, as well as velocities and the time of each measurement. This measurement, or results, may be continuous or timed. The results may be expressed in various forms, such as text, visual forms such as graphs, and any other form that conveys information gathered and/or generated by the ALDA 800. In some embodiments, performance of measurement operations by the ALDA 800 may be triggered by the detection of fluid, and/or fluid flow, in a line or component that is in fluid communication with a location where the ALDA 800 resides.

In further detail, in one mode of operation, the ALDA 800 directs light/energy/radiation so that it impinges upon the material(s) in the line—the reflected or returned energy, resulting from the impingement, may only be some fraction of that which was transmitted. Particularly, example embodiments may consider a fundamental relationship between the error in the estimated mean frequency shift, the bandwidth of the returned energy, and the number of incident backscattered photons that are detected. To this end, an optical receiver of the ALDA 800 may implement a frequency analysis function that may be employed to carry out two techniques for detecting, namely: (1) coherent detection of backscatter energy within the receiver—this method may have backscatter mixed with the oscillating laser radiation and the detector output signal, which may be a function of the received backscatter energy, may be digitized and spectrally processed; and (2) direct detection—this approach may involve an embodiment of the ALDA that includes an interferometer that may optically analyze the backscattered radiation.

With regard to measurement and use of a doppler shift, when the ALDA 800 is situated in a pipe or other volume of interest, it may can scan that volume and capture the exact volume of fluid flowing through a specific orifice, opening, pipe, or other component. This scan may enable determination of the volumetric flow rate, or simply 'flow rate' in the volume of interest, as noted hereafter. The volume of fluid may be provided, rather than calculated. When flow then passes through the volume of interest, any aerosols, solids, molecules, particulates, or objects suspended in the flow stream, may be detected by the ALDA 800, and the ALDA 800 may determine the velocities of those detected materials. With the volume of fluid and fluid velocity known, the flow rate may be determined by $Q=V \cdot a$ (where Q is the flowrate, V is velocity, and 'a' is the area of the opening through which the flow occurs). When the optical beam hits a moving target, moving towards or away from the ALDA 800, the specific wavelength of the scatter or reflected light created from the target will change, or shift. This describes how the doppler effect works when incorporated within LiDAR.

In an embodiment, the performance of an optical scan may comprise various operations. In general, the performance of an optical scan using LiDAR may include a process of acquiring a 3D (three dimensional) point cloud of an environment using laser pulses. In more detail, performance of an optical scan as referred to herein may comprise various operations, including, but not limited to: [1] transmitting laser pulses—the LiDAR emits short pulses of laser light, possibly in the form of a fan-shaped or cylindrical beam—the pulses may be emitted at a high frequency, such as several thousand pulses per second, for example; [2] scanning the environment—as the laser pulses travel through the environment, they may reflect off surfaces, fluids, particles, and/or other materials, so as to create a backscatter signal that returns to the LIDAR sensor—the timing and direction of the laser pulses transmitted into/through the environment may be controlled to ensure that they cover the desired area and capture accurate data; [3] measuring the time-of-flight—when a laser pulse reflects off a surface, fluid, particle, and/or other material(s), and returns to the LiDAR sensor as a backscatter signal, the LiDAR measures the time that it took for the pulse to travel to the surface, fluid, particle, and/or other material(s), and back—this time-of-flight measurement may be used to calculate the distance, from the LiDAR device, to the surface, fluid, particle, and/or other material(s), as well as calculate the 3D location, in space, of one or more points, on the surface, fluid, particle, and/or other material(s), at which the optical signal was initially directed; [4] generating a point cloud—the LIDAR sensor may collect thousands, hundreds of thousands, millions, or more, of individual distance measurements per second, which may be combined to form a dense 3D point cloud of the scanned environment—each point in the point cloud represents a surface or object that was hit by a laser pulse; and [5] processing the data—the point cloud data may be processed using specialized software to filter out noise, remove outliers, and generate a smooth and accurate representation, such as a 3D representation, of the scanned environment.

With continued reference now to the example of FIG. 8, an optic encloser 802 may house an optical transmitter 804. The optic encloser may be configured and operable to incorporate goggles, or small narrow tunnels that the transmitter transmits a beam through and a small tunnel that the backscatter is collected through by the receiver. Lenses may be incorporated into the optic encloser goggles. The optical transmitter 804 may comprise a laser or other device capable of emitting an optical signal, and may be located within the optic encloser 802. The beam, which may be a laser beam, emitted by the optical transmitter 804 may be red, yellow, blue, green, or orange. The color of the beam may be changed based on application. The optical transmitter may be operable to transmit an optical signal having a narrow spectral width. The beam may be transmitted through a lens 806 may be used to focus the beam generated by the optical transmitter 804. The lens may be configured and operable to a variety of thicknesses. The lens 806 may comprise a generator lens, an aspheric lens, or a cylindrical lens.

After passing through the lens 806, when provided, an optical signal from the optical transmitter 804 may pass through a window 808. The window 808 may be any suitable shape or size. The window 808 may be incorporated into the ALDA 800 to enable the beam 801 from the optical transmitter 804 to pass through, and to enable the backscattered energy 803 to return to an optical receiver, an example of which is discussed below. The window may also be incorporated with electrodes, or a heating element, that is configured and operable to keep the window from fogging and ensure that condensate does not build up on the window surface. A coating may also be added to the surfaces of the window to assist in keeping the condensates and fog from building up on its surface. The window 808 may be made of materials identified elsewhere herein for the construction of a window.

With continued attention to FIG. 8, the beam 801 may be generated by the optical transmitter 804 and transmitted through the lens 806, window 808, and axially down the pipe. The beam 801 may interact with materials and/or phenomena, collectively denoted at 805, that are present in the pipe such as, for example, aerosols, suspended solids, fluids, particulates, and this interaction may be manifested as changes in a wavelength of the 801 beam resulting, for example, from the turbulence and/or direction of flow of the materials traveling through the system. The material(s) with which the beam 801 interacts travel with the flow of the exhaust, gas, or emission.

The interaction of the beam 801 with materials in the pipe may result in the reflection and redirection of part of the beam 801, which may comprise photons and/or electrons. The redirected portion(s) of the beam 801 may interact with the beam 801 itself to create a backscatter signal 803 that may comprise photons and/or electrons. As noted herein, backscatter may comprise high energy level electrons, or photons, that may be generated by scattering events created by incident electrons within the transmitter beam 801. The backscatter signal 803 may return back to an optical receiver, and example of which is discussed below.

In more detail, backscatter includes the reflection or scattering of light back towards the source by particles in a fluid medium, such as air or water. In LiDAR (Light Detection and Ranging), backscatter occurs when a laser beam is emitted from a LIDAR sensor and hits particles in the air or water, causing the light to scatter in all directions. Some of this scattered light is then reflected, as the backscatter signal 803, back towards the LiDAR sensor, where it is detected and analyzed. When a LiDAR uses a Doppler shift to measure volume and flow rates, the LiDAR detects the backscattered light and analyzes the frequency shift of the scattered light. As particles move within a fluid or gas, those particles cause a Doppler shift in the frequency of the backscattered light. This shift may be used to measure the velocity of the particles, and from there, the flow rate and volume of the fluid or gas can be calculated.

To illustrate, in the case of a LIDAR system that is measuring the flow rate of water in a river, the emitted laser beam will hit water particles and cause the light to scatter. Some of this scattered light will be reflected back towards the LiDAR sensor, where the frequency shift caused by the motion of the water particles will be analyzed. By measuring the frequency shift, the LiDAR can determine the velocity of the water particles and use that information to calculate the flow rate of the river.

Before reaching the optical receiver, the backscatter signal 803 may first pass through the window 808, and then a lens 810. The lens 810 may operate to focus the backscatter signal 803. The lens 810 may be configured and operable to a variety of thicknesses. The lens may be a generator lens, aspheric, or cylindrical lens. Various other passive optical elements, such as collimators for example, may be employed to process one or more optical signals.

An optical receiver 812 that receives the backscatter signal 803 may comprise a detector, such as a photodiode, that may be located within the optic encloser 802. The detector, receives the backscatter signal 803, which may comprise one or more optical signals, and converts the optical backscatter signal 803 into a corresponding electrical signal that is a function of the backscatter energy. For example, that electrical signal may indicate a strength of the backscatter energy, and may also indicate a doppler shift of the backscatter signal 803.

C.9 Operational Flow Diagram

Figure 9:
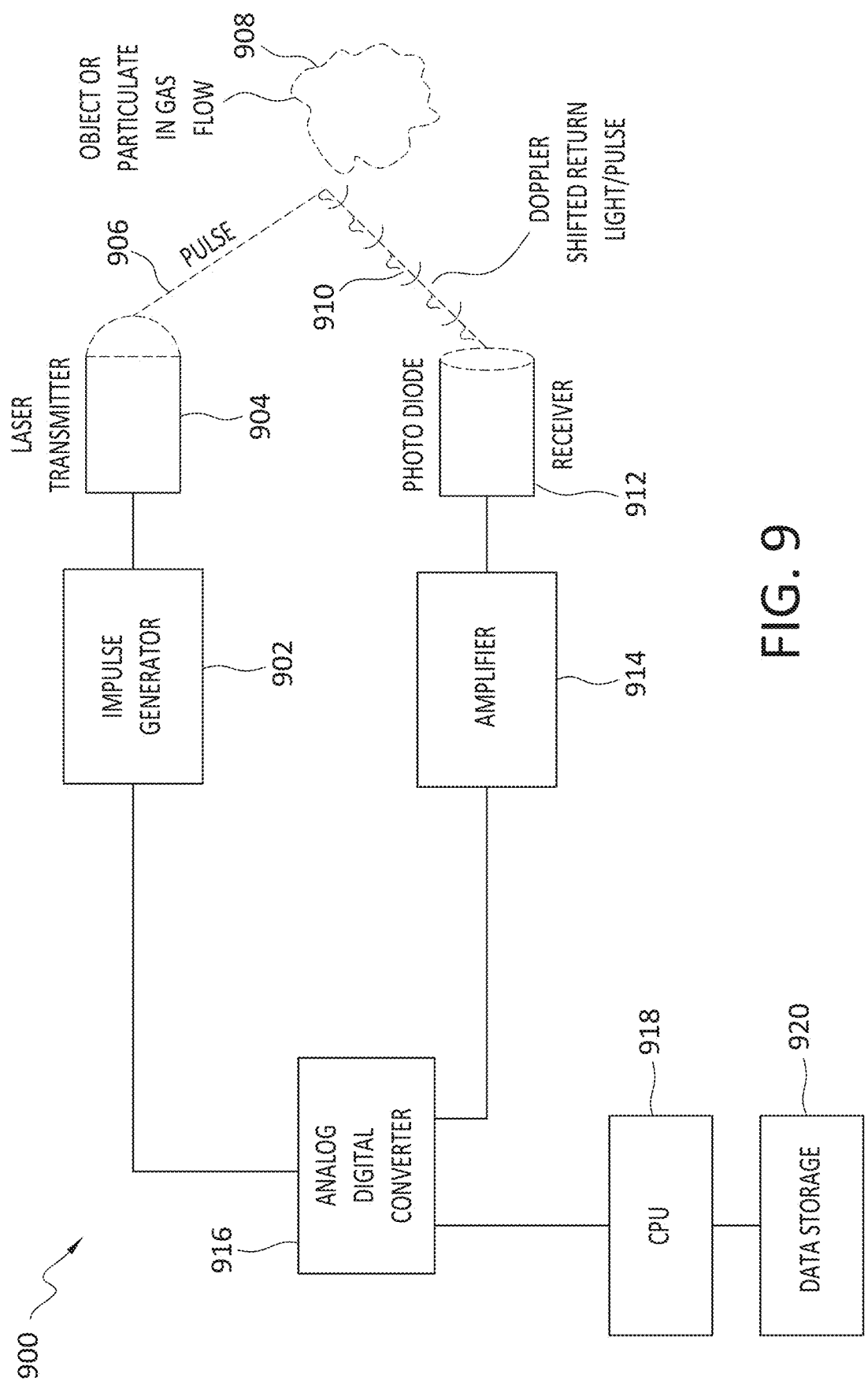
FIG. 9 discloses an example operational flow diagram.

With attention now to FIG. 9, details are provided concerning some example operations that may be performed by an ALDA 900 according to one embodiment of the invention. As shown, the ALDA 900 may comprise an impulse generator 902 that serves as an energy source that may provide power, and control signals, to an optical transmitter 904, which may comprise a laser for example, to cause the optical transmitter 904 to transmit a signal, which may comprise a beam, ray, or light, for example.

In more detail, the optical transmitter 904 may generate an optical signal 906 that may be directed, by the optical transmitter 904 and/or other components such as a mirror or prism, towards material(s) 908 and/or a location, such as a location within a pipe or tube. In some embodiments, the impulse generator 902 and the optical transmitter 904 may be combined together in a single assembly. In an embodiment, the optical signal 906 may comprise one or more pulses, or may be transmitted continuously, for example.

The material(s) 908 may comprise objects and materials that may be impinged upon by the optical signal 906 transmitted by the optical transmitter 904, specifically, such objects and materials may comprise, for example, aerosols, suspended solids, fluids, and particulates, and combinations of any of these. In some cases, the optical signal 906 may, as a result of its interaction with the material(s) 908, experience a change in its wavelength, and/or its other properties, due to phenomenon such as, but not limited to, turbulence and/or the direction of flow traveling through the system. The material(s) 908 impinged upon by the optical signal 906 may be traveling with, such as by entrainment for example, the flow of the exhaust, gas, emission, and/or other materials in the line to which the ALDA 900 is connected.

As shown in FIG. 9, interaction of the optical signal 906 with materials 908 in the line may result in the generation of a backscatter signal 910 that comprises energy reflected by the materials 908. The energy in the backscatter signal 910 may take various forms consistent with the nature of the beam that was initially transmitted such as, but not limited to, high energy level electrons, or photons.

The backscatter signal 910 may be received by an optical receiver 912 of the ALDA 900. The optical receiver 912 may be located within an optic housing and may be configured and operable to receive data, in the form of a backscatter signal 910, and in turn estimate the backscattered energy and doppler shift of the backscatter signal 910. The optical receiver 912 may comprise a photodetector, such as a photodiode or other photoelectric device for example, or a photo multiplier. In more detail, the optical receiver 912 may collect the energy that comprises the backscatter signal 910 and may convert that energy to an electrical signal that may comprise or embody data, insofar as the electrical signal may indicate, for example, the strength and amount of the energy of the backscatter signal 910.

The electrical signal generated by the optical receiver 912 may be passed to an amplifier 914. The amplifier 914 may increase the amplitude and/or frequency of the signal that is generated by the optical receiver 912. The amplifier 914 may then send the amplified signal, or data, to an ADC 916 (analog to digital converter) and/or to a CPU 918. The ADC 916 may convert an analog signal, such as from the amplifier 914, to a digital signal, and the CPU 918 may be used to execute algorithms, send commands, send control signals, communicate with the system, store data, process data, and transmit data. In an embodiment, the CPU 918 may pass data to data storage 920, which may comprise a database for example, so that data may be preserved in case of lost power of transmission of communication between the ALDA 900 and a host server and/or other systems and devices.

With further attention to the amplifier 914, an embodiment may employ the amplifier 914 to amplify a backscatter signal before that signal is sent to the analog-to-digital converter (ADC) 916. Amplification of the backscatter signal may improve the signal-to-noise ratio (SNR) of the received signal and ensure that it can be accurately digitized by the ADC 916. In an embodiment, the backscatter signal may be weak, especially if the LiDAR is operating over long distances or in adverse conditions. Thus, the amplifier 914 may increase the amplitude of the received signal, that is, the backscatter signal, making the signal easier to detect and analyze.

Note that the amplifier 914 may introduce noise and distortion to the backscatter signal that is being amplified, and such noise and distortion may affect the accuracy of the measurement. Therefore, it may be important to carefully calibrate the amplifier 914 and ensure that it is properly matched to the LiDAR system and the conditions under which it is operating. Once the signal has been amplified, the amplified signal may be sent to the ADC 916 which may operate to convert the analog amplified signal into a digital signal that can be processed by a computer or other digital device. In an embodiment, the ADC 916 may sample the signal at a fixed rate and quantize each sample into a digital value, which may be further processed and analyzed.

With continued reference to FIG. 9, it is noted that the ADC 916 is not directly connected to the impulse generator 902. The impulse generator 902 responsible for controlling transmission of the laser pulses that are used to scan the environment and measure the velocity of particles in a fluid or gas. The backscattered light from these laser pulses is then detected by the LiDAR receiver and amplified before being digitized by the ADC 916. In an embodiment, the connection between the ADC 916 and the impulse generator 902 is indirect and may occur by way of a LiDAR control system, an example of which is disclosed in FIG. 10 at 1006. Among other things, the LiDAR control system may coordinate the timing and synchronization of the laser pulse emission by the optical transmitter 904, the LiDAR optical receiver 912 operation, and the ADC 916 sampling, to ensure that the received signal is accurately digitized and can be processed to extract velocity or flow rate information.

Specifically, a LIDAR control system according to an embodiment may operate to set the timing and duration of the laser pulse emission, the time delay between the pulse emission and the start of the ADC 916 sampling, and the sampling rate of the ADC 916. These parameters may be calibrated and coordinated to ensure that the backscattered signal is accurately digitized and that the Doppler shift measurement is precise and reliable.

C.10 ALDA Electrical and Communication Flow

Figure 10:
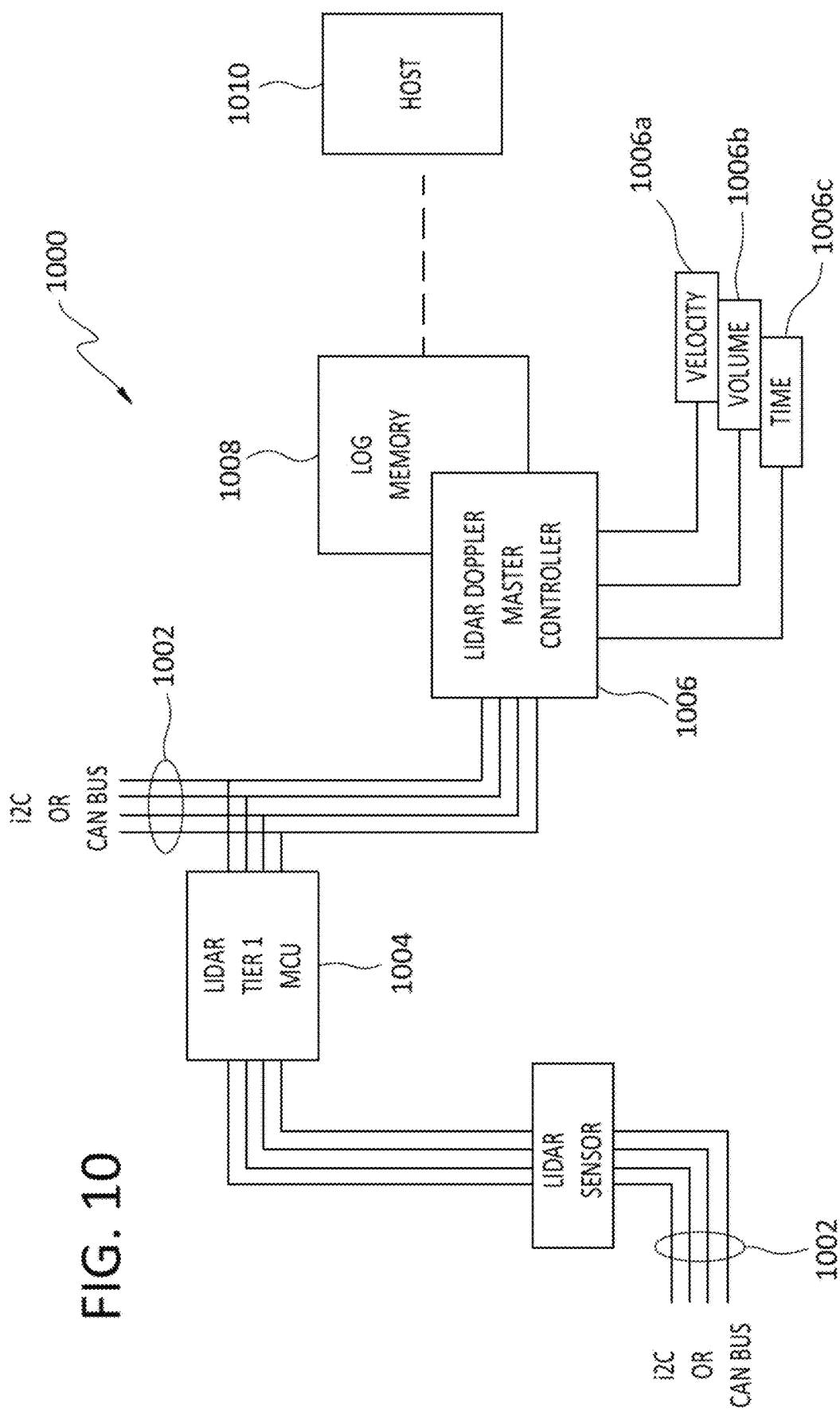
FIG. 10 discloses an example ALDA electrical diagram.

Turning next to FIG. 10, details are provided concerning example electrical/electronic devices and communications, according to one example embodiment. In FIG. 10, and example control, command, and communication, (C3) system 1000 is disclosed.

The C3 system 1000 may include one or more I2C, or CAN, bus(es) 1002 that may comprise one or more master controllers and a backbone of as few as 2 wires, in some embodiments. In an embodiment, the two wires may be a [1] a serial clock wire, and [2] a serial data commands wire, to/from the bus 1002. The bus 1002 may use controllers that are high speed or low speed electronics with simple commands of 'Start' and 'Stop' command parameters in conjunction with, or in addition to, functions for writing and/or reading information including, but not limited to, a bit, or a byte.

With more detailed reference to example 'Start' and 'Stop' commands, in a LIDAR system with a Doppler shift, these commands may be used to initiate, and terminate, respectively, the measurement of velocity, and/or flow rate, of a fluid. The 'Start' command may trigger the LiDAR system to emit laser pulses and start detecting the backscattered light, while the 'Stop' command may signal the LiDAR system to stop emitting laser pulses and terminate the measurement.

In an embodiment, a 'Start' command may initiate a scanning process, examples of which are disclosed herein, in which a LiDAR system may emits laser pulses at a fixed frequency, which may be detected by the LiDAR system as backscattered light. As the laser pulses reflect off particles in the fluid or gas, the Doppler shift of the backscattered light may be detected and used to calculate the velocity of the particles. A 'Stop' command may be used to terminate a scanning process and stop emission of laser pulses. Once the scanning process is complete, the LiDAR system may perform additional processing on the digitized signals to extract more detailed information about the velocity or flow rates, such as by applying filters or performing spectral analysis to the digitized signals. In general, the 'Start' and 'Stop' commands may be controlled by a LIDAR control system, which coordinates the operation of the various LiDAR components to ensure accurate and reliable measurements. The LiDAR control system may also include additional features, such as automatic gain control and noise filtering, to further improve the accuracy of the measurement.

With continued reference to the example of FIG. 10, having multiple controllers may enable the designation of individual controllers, outside of the master controller, as slave controllers/devices. Commands to the slave controllers may come from the master controller. The I2C protocols may have communications that are initiated by a master controller, an example of which is discussed below, that may first initiate the 'Start' condition, and then read the address of a slave device. Depending upon what bit is read from the address byte of the slave device, the master controller may write to another slave device. Once all the bytes are read and/or written, the master controller may generate a 'Stop' condition, which may end the communication to that specific device and open/allow for other devices to communicate on the I2C bus. This same protocol may be repeated and instead of ending the communication with the 'Stop' condition, the master controller may repeat the protocol or change the mode from writing to reading.

In an embodiment, the bus 1002 may comprise CAN (Controller Area Network) bus, which is a communication-based protocol that may be configured and operable to allow other Control Units such as MCUs or PCBs to communicate with each other. There may be one single line that may handle all communications throughout the ALDA. The CAN bus may be made up of two different wires. These two wires may correspond to 'CAN High' and 'CAN Low.'

In more detail, an embodiment may run a LIDAR system with a Doppler shift off of a CAN bus. In this case, the 'CAN high' and 'CAN low' lines may be used to transmit control and status information between the LiDAR system and other devices connected to the CAN bus. In an embodiment, the CAN bus comprises a serial communication protocol that is used to enable devices to communicate with each other. The protocol uses two wires, known as 'CAN high' and 'CAN low,' to transmit differential signals that represent digital data. These wires may be twisted together to reduce electromagnetic interference.

In the context of an embodiment that uses a LIDAR system with a Doppler shift, the CAN bus may be used to transmit commands and control signals from a host computer or controller to the LiDAR system, and to transmit status and measurement data from the LiDAR system back to the host device. For example, a host device may send a 'Start' command to the LiDAR system over the CAN bus to initiate a scanning process, and may receive velocity or flow rate data from the LiDAR system over the same bus. Similarly, the host device may monitor the status of the LiDAR system, such as its power supply voltage or temperature, over the CAN bus. Thus, when running a LiDAR system, with a Doppler shift, off of a CAN bus, the 'CAN high' and 'CAN low' lines may be used to enable communication between the LiDAR system and other devices connected to the CAN bus, thus enabling control and status information to be transmitted back and forth.

With continued reference to FIG. 10, the C3 system 1000 may comprise a Tier 1 MCU 1004. The Tier 1 MCU 1004 may be incorporated to act as a slave controller, or other control device, that communicates with a master controller 1006. The Tier 1 MCU 1004, commanded by the master controller 1006, may handle control signals to other components or sensors within the system and communicate back to the master controller 1006.

The master controller 1006, which may take the form of a LIDAR doppler master controller, may handle all controls and communication to/from the system, that is, the ALDA. The master controller 1006 may be programmed to be autonomous, or controlled externally by commands from an external CPU or host server. The master controller 1006 may also have processors on board that allow for programming the ALDA and analyzing the data collected by the ALDA. Such data may include, but is not limited to: (i) velocity data 1006a—the velocity of the fluid flow is collected by the ALDA and may be interpreted in the master controller 1006; (ii) volume data 1006b—the volume of fluid flow may be interpreted by the master controller 1006 once the velocity of flow is collected; and (iii) time data 1006c—elapsed time may be recorded by the master controller 1006.

The 3C system 1000 may further comprise a LOG memory 1008, which may be accessible to the master controller 1006. The LOG memory 1008 may be an onboard memory device that transmits and/or stores the data collected by the ALDA. A host 1010 may communicate with the LOG memory 1008 to receive and/or retrieve data from the LOG memory 1008. The host 1010 may be an external device that data from the ALDA is sent to. The host 1010 may comprise, for example, an HMI, CPU, or PLC, or other computing component or computing system.

C.11 Wellsite Schematic with VRU

Figure 11:
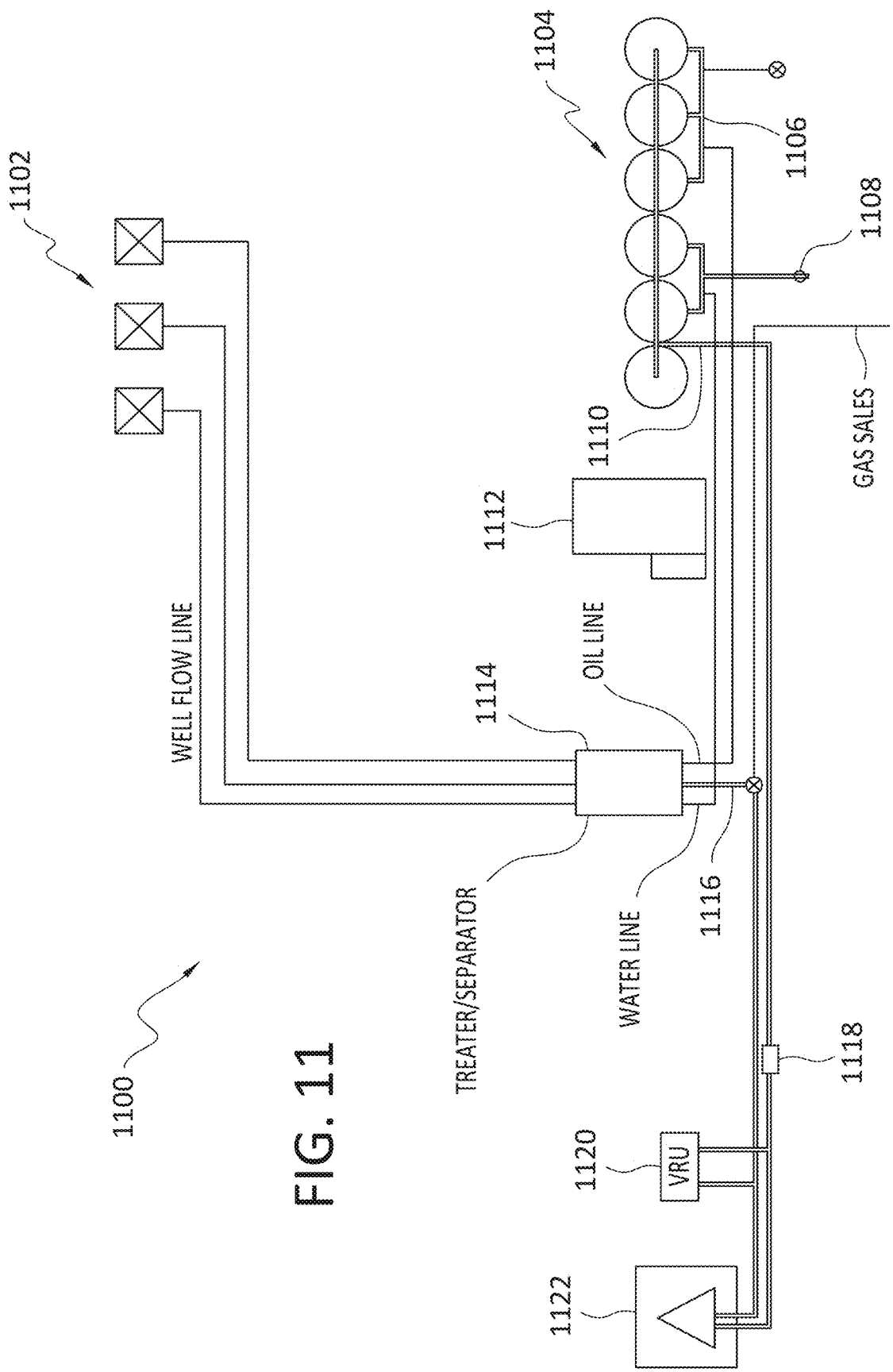
FIG. 11 discloses a wellsite schematic with Vapor Recovery Unit (VRU).

FIG. 11 discloses an example wellsite 1100 that includes a vapor recovery unit (VRU), discussed below. Briefly, a VRU may capture gases and emissions that are being admitted by elements of the wellsite 1100 such as wells 1002, and a tank battery 1004. Except as noted hereafter, the wellsite 1100 may be similar, or identical, to the wellsite 100 in terms of the configuration, components, operations, and capabilities, of the wellsite 100. As such, only selected aspects of the wellsite 1100 are discussed in detail below.

As shown, the wellsite 1100 may comprise one or more wells 1102, a tank battery 1104, water transfer lines 1106, a sales line, or line to midstream, 1108, an LP line 1110, power and communication station 1112, HP separation vessel 1114, HP line 1116, and knockout 1118. The wellsite 1100 may additionally comprise a vapor recovery unit (VRU) 1120 that may be connected with the tank battery 1104, and the HP separation vessel 1114, by way of the HP line 1116. In an embodiment, the VRU 1120 may comprise a compressor that may operate to recover exhaust, or emitted, vapors from hydrocarbons and other fuels at the wellsite 1100. The recovered fuels may be sold, or reused.

Finally, the example wellsite 1100 may comprise a flare stack 1122. The flare stack 1122 may be the final destination for gas and/or tank vapor gas. Gases may be burned, or vented to atmosphere if the quantity of gas is small, at the flare stack 1122. The flare stack 1122 may comprise two flares, one for low pressure tank vapors, and one for venting/burning materials received by way of the HP line 1116.

C.12 Volume of Gas to VRU Measured by ALDA

Figure 12:
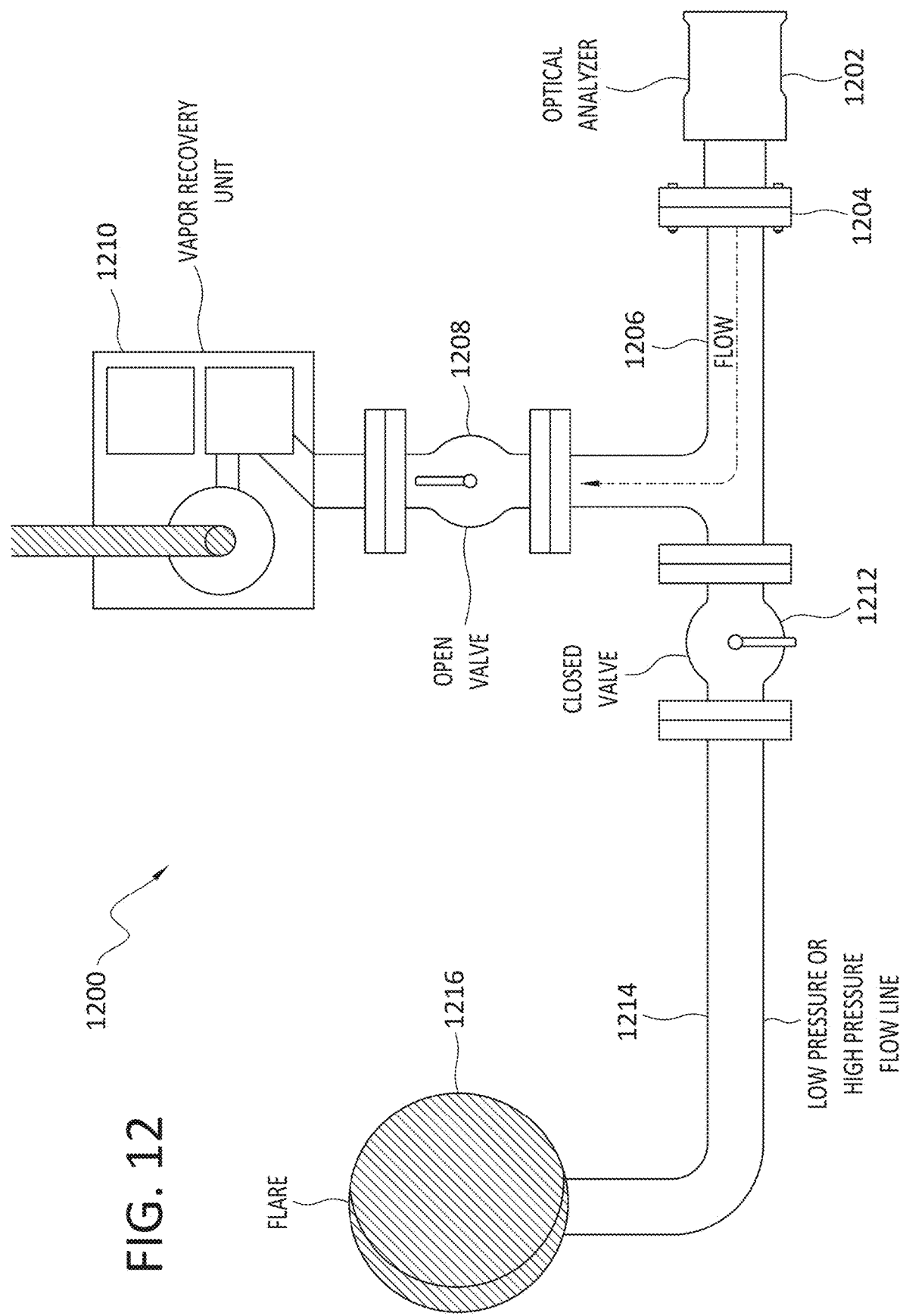
FIG. 12 discloses a volume of gas measured to VRU by an example ALDA.

FIG. 12 discloses a system 1200 that comprises an example ALDA, where the system 1200 may comprise a low pressure, or high-pressure, emissions system that comprises a VRU. In an embodiment, the ALDA may be incorporated within the system 1200. In the example of FIG. 12, an inlet valve to the VRU is open, and an inlet valve to the flare stack, or emissions stack, is closed. The ALDA may measure the volume and velocity of gas or emissions that are flowing into the VRU. The system may be set up so that the ALDA can communicate electronically by Wi-Fi, Bluetooth, or tethered connection with either of the two inlet valves. The ALDA may measure a large volume of gas, or emissions flowing through the system and communicate with the flare side inlet valve to close and for the VRU inlet valve to open. Further details concerning the system 1200 are set forth below.

As shown, the system 1200 may comprise an ALDA 1202. The ALDA 1202 may comprise, or connect to, an adapter flange 1204 that may be attached to a pipe, fluid enclosure, or any pipe, system, or opening, that leads to a fluid source from within which the ALDA 1202 may collect data. The direction of fluid flow within a portion of the system 1200 is indicated at 1206. The flow may comprise, for example, gas, vapor, emission, or exhaust.

A VRU inlet valve 1208, which may be remotely and/or automatically controlled, controls the flow of materials into a VRU 1210. The VRU inlet valve 1208 may open, or close, dependent on a preferred composition of gas and/or other materials, or volume of flow through the system 1200.

Adjustments to the flowrate into the VRU 1210 may be made by partly, or fully, opening/closing the VRU inlet valve 1208.

A flare inlet valve 1212, which may also be referred to herein as an 'exhaust valve,' may control the flow of materials through a line 1214, which may serve as an HP line or an LP line depending upon the materials in the line 1214, to a flare stack that comprises one or more flares 1216. The flare inlet valve 1212 may open or close, fully or partly, dependent on a preferred composition of gas and/or other materials, or volume of flow through the system.

C.13 Volume of gas measured to VRU by ALDA

Figure 13:
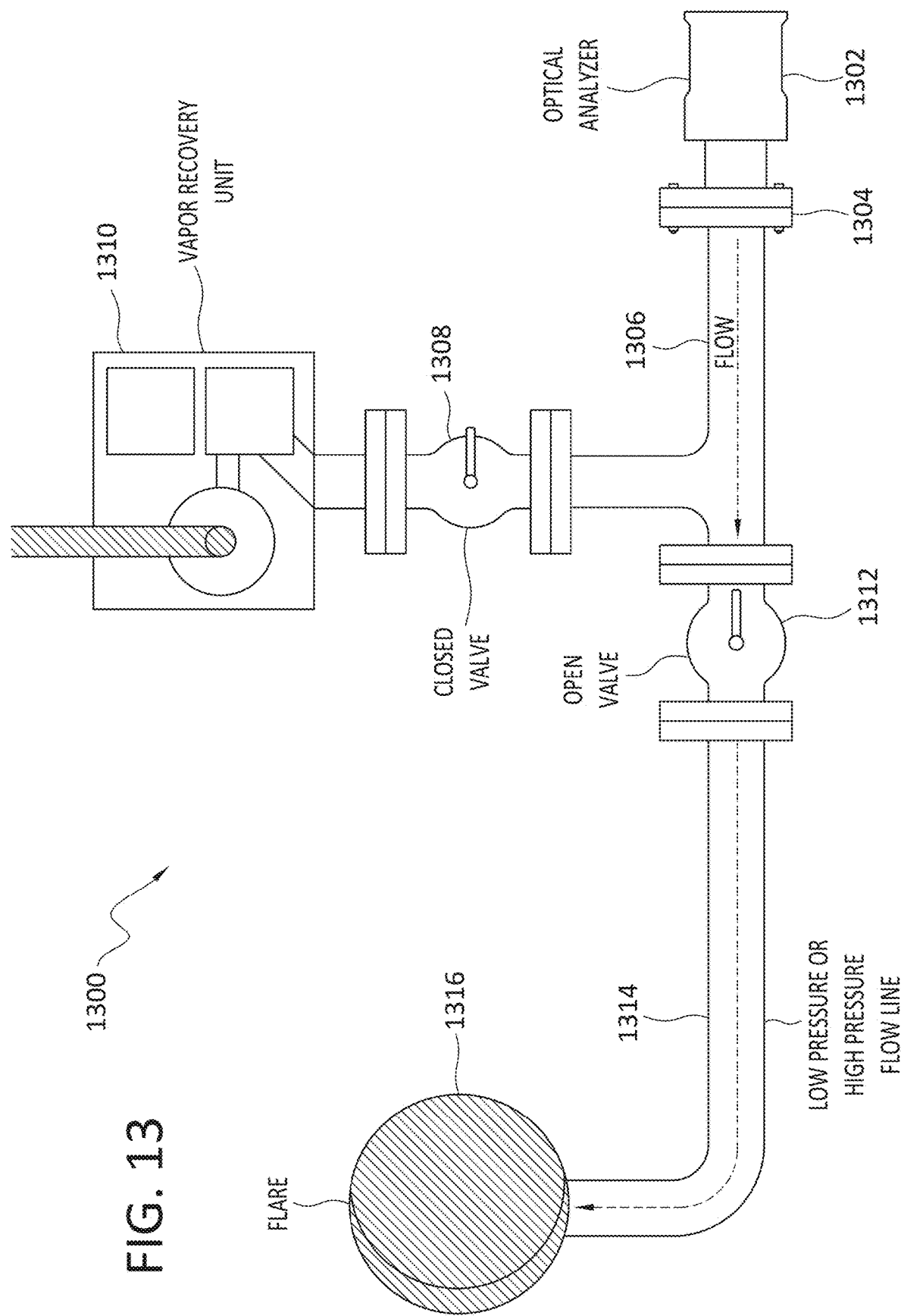
FIG. 13 discloses a volume of gas measured to flare stack by an example ALDA.

Turning now to FIG. 13, there is disclosed a system 1300 that may be similar, or identical, to the system 1200 in terms of the configuration, components, operations, and capabilities, of the system 1200. As such, only selected aspects of the system 1300 are discussed in detail below.

Particularly, FIG. 13 discloses a system 1300 that comprises an example ALDA, where the system 1300 may comprise a low pressure, or high-pressure, emissions system that comprises a VRU. In an embodiment, the ALDA may be incorporated within the system 1300. In the example of FIG. 13, an inlet valve to the VRU is closed, and an inlet valve to the flare stack, or emissions stack, is open. The ALDA may measure the volume and velocity of gas or emissions that are flowing into the VRU. The system may be set up so that the ALDA can communicate electronically by Wi-Fi, Bluetooth, or tethered connection with either of the two inlet valves. The ALDA may measure a large volume of gas, or emissions flowing through the system and communicate with the flare side inlet valve to close and for the VRU inlet valve to open. Further details concerning the system 1300 are set forth below.

As shown, the system 1300 may comprise an ALDA 1302. The ALDA 1302 may comprise, or connect to, an adapter flange 1304 that may be attached to a pipe, fluid enclosure, or any pipe, system, or opening, that leads to a fluid source from within which the ALDA 1202 may collect data. The direction of fluid flow within a portion of the system 1300 is indicated at 1306. The flow may comprise, for example, gas, vapor, emission, or exhaust.

A VRU inlet valve 1308, which may be remotely and/or automatically controlled, controls the flow of materials into a VRU 1310. The VRU inlet valve 1308 may open, or close, dependent on a preferred composition of gas and/or other materials, or volume of flow through the system 1300. Adjustments to the flowrate into the VRU 1310 may be made by partly, or fully, opening/closing the VRU inlet valve 1308.

A flare inlet valve 1312, which may also be referred to herein as an 'exhaust valve,' may control the flow of materials through a line 1314, which may serve as an HP line or an LP line depending upon the materials in the line 1314, to a flare stack that comprises one or more flares 1316. The flare inlet valve 1314 may open or close, fully or partly, dependent on a preferred composition of gas and/or other materials, or volume of flow through the system.

D. Example Methods

Figure 14:
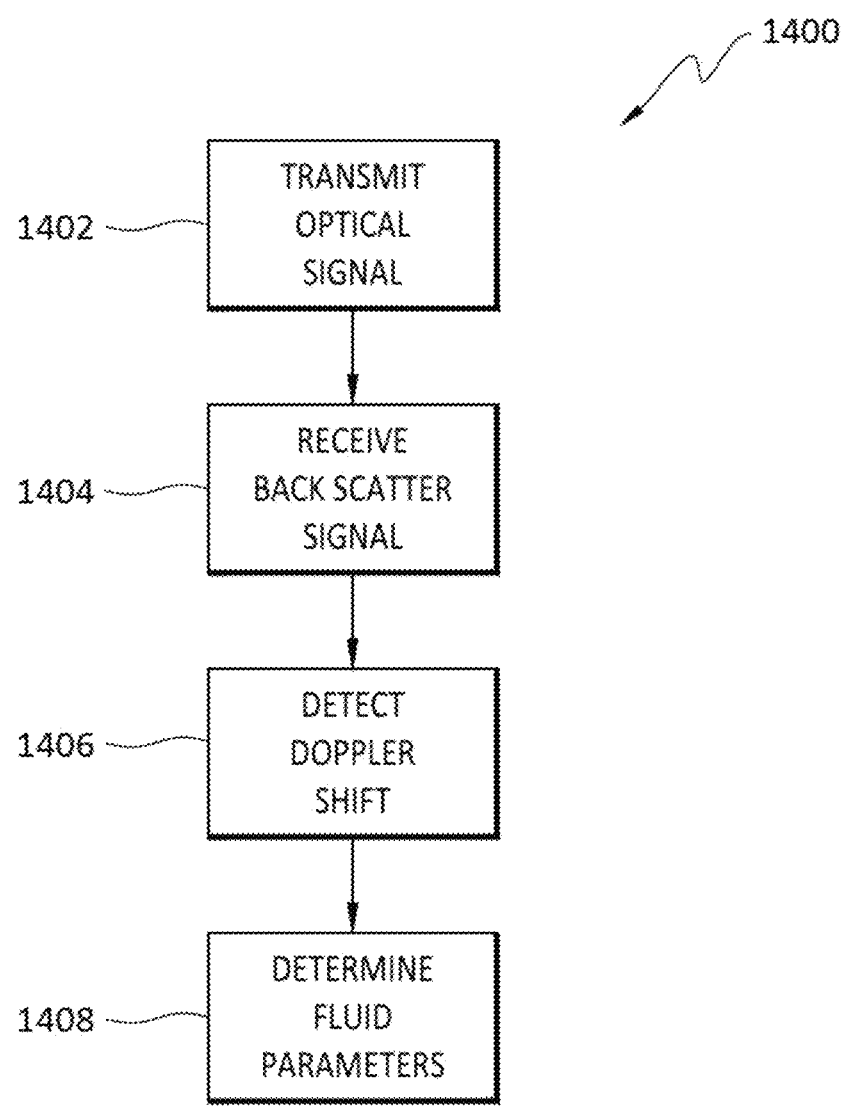
FIG. 14 discloses an example method, according to one embodiment.

With attention now to FIG. 14, an example method according to one embodiment of the invention is denoted at 1400. The example method 1400 may be performed by an embodiment of an ALDA. In an embodiment, the method 1400 may be performed by an ALDA while the ALDA is connected to a piping system and in fluid communication with a portion of the piping system. The ALDA may be configured and positioned to perform the method 1400 with respect to a flow of fluid in a piping system.

The example method 1400 may be performed when a LiDAR unit of an ALDA transmits 1402 an optical signal with/against a flow of fluid, and/or a volume of fluid, present in a fluid conduit or other component that holds the fluid. As a result of impingement of the optical signal on the fluid, a backscatter signal may be generated that is received 1404 by the ALDA. Next, a doppler shift as between the transmitted signal and the backscatter signal may be determined 1406. The doppler shift may then be used to determine 1408 one or more fluid parameters, examples of which are disclosed herein, and include fluid flow rate, fluid volume, fluid density, and fluid specific gravity.

E. Example Computing Devices and Associated Media

The embodiments disclosed herein (including those in Appendix A hereto) may include the use of a special purpose or general-purpose computer, including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by FIGS. 1-13 and/or elsewhere herein, may take the form of, or include, or be implemented on, or hosted by, a physical computing device. Part, or all, of the physical computing device may comprise an element of an ALDA (Axial LiDAR Doppler Analyzer). As well, an ALDA may comprise a physical computing device, as contemplated herein.

Such a physical computing device may include a memory which may include one, some, or all, of random access memory (RAM), non-volatile random access memory (NVRAM), read-only memory (ROM), and persistent memory, one or more hardware processors, non-transitory storage media, UI (user interface) device/port, and data storage. One or more of the memory components of the physical computing device may take the form of solid-state device (SSD) storage. As well, one or more applications may be provided that comprise instructions executable by one or more hardware processors to perform any of the operations, or portions thereof, disclosed herein. Such executable instructions may take various forms including, for example, instructions executable to perform, and/or cause the performance of, any method, process, or portion of these, disclosed herein.

F. Further Aspects and Example Embodiments

Following are some further example aspects and embodiments of the invention. These are presented only by way of example and are not intended to limit the scope of the invention in any way.

Embodiment 1. A measurement device, comprising: a LIDAR unit comprising a transmitter operable to transmit a signal; a receiver operable to receive a backscatter signal that comprises a portion of the signal; and a processor operable to: determine a doppler shift as between the signal and the backscatter signal; and use the doppler shift to determine a volume of a fluid to which the signal is directed, and from which the backscatter signal is received.

Embodiment 2. The measurement device as recited in embodiment 1, wherein the transmitter comprises a laser, and the receiver comprises a photodiode.

Embodiment 3. The measurement device as recited in any of embodiments 1-2, wherein the measurement system further comprises a housing in which the transmitter and receiver are positioned, and the housing is configured to interface with an element of a piping system.

Embodiment 4. The measurement device as recited in any of embodiments 1-3, wherein the measurement system further comprises a window configured and arranged for contact with a fluid when the measurement device is connected into a fluid system that holds the fluid.

Embodiment 5. The measurement device as recited in any of embodiments 1-4, wherein the processor is operable to determine the volume on a continuous and/or intermittent basis.

Embodiment 6. The measurement device as recited in any of embodiments 1-5, wherein the measurement device is operable to communicate electronically with a device that is operable to manage fluid flow in a piping system.

Embodiment 7. The measurement device as recited in any of embodiments 1-6, wherein the measurement device further comprises a reflector configured and arranged to direct the signal transmitted by the transmitter.

Embodiment 8. The measurement device as recited in any of embodiments 1-7, wherein the measurement device includes a connection operable to receive power, control signals, and communications, from one or more other devices.

Embodiment 9. An exhaust system that includes the measurement device of any of embodiments 1-8.

Embodiment 10. A method, comprising: transmitting, with a LiDAR unit, a signal into a fluid in a piping system; receiving a backscatter signal generated as a result of impingement of the signal on the fluid; detecting a doppler shift as between the signal and the backscatter signal; and determining, using the doppler shift, a volume of the fluid.

Embodiment 11. The method as recited in embodiment 10, wherein the fluid comprises any one or more of: particulates; one or more gases; or one or more liquids.

Embodiment 12. The method as recited in any of embodiments 10-11, wherein the fluid comprises one or more hydrocarbons and/or hydrocarbon combustion products.

Embodiment 13. The method as recited in any of embodiments 10-12, wherein the volume is determined on an ongoing basis.

Embodiment 14. The method as recited in any of embodiments 10-13, wherein the volume is determined on an intermittent basis.

Embodiment 15. The method as recited in any of embodiments 10-14, wherein the fluid is flowing when the doppler shift is detected.

Embodiment 16. The method as recited in any of embodiments 10-15, wherein the signal is transmitted in an axial direction within a fluid system element that contains the fluid.

Embodiment 17. The method as recited in any of embodiments 10-16, wherein the detecting is performed either by direct detection through the use of an interferometer operable to optically analyze the backscatter signal, or by a combination of backscatter analysis and use of oscillating laser radiation to generate a detector output signal.

Embodiment 18. The method as recited in any of embodiments 10-17, wherein the signal is transmitted from one side of a pipe to another side of the pipe at an angle, measured relative to a pipe axis, in a range of about 10 degrees to about 20 degrees.

Embodiment 19. The method as recited in embodiment 18, wherein the transmitted signal is directed, and/or redirected, using a mirror, or a prism.

Embodiment 20. A measurement device operable to perform the method of any of embodiments 10-19.

Embodiment 21. A non-transitory storage medium carrying instructions that are executable by one or more hardware processors to perform, or cause the performance of, part or all of any of the methods of embodiments 10-19.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A measurement device, comprising:
   a doppler LiDAR unit comprising an optical transmitter operable to transmit a signal, and further comprising an optical receiver operable to receive a backscatter signal that comprises a portion of the signal;
   a window through which the signal and the backscatter signal are able to pass, and the window is configured and arranged for contact with a fluid when the measurement device is connected into a fluid system that holds the fluid; and
   a processor operable to:
      determine a doppler shift as between the signal and the backscatter signal; and
      use the doppler shift to determine a volumetric flow rate of a fluid to which the signal is directed, and from which the backscatter signal is received,
   and regardless of whether the signal is transmitted with, or against, a direction of flow of the fluid, the doppler LiDAR unit and processor are collectively operable to determine the volumetric flow rate, and a volume of the fluid.

2. The measurement device as recited in claim 1, wherein the transmitter comprises a laser, and the receiver comprises a photodiode.

3. The measurement device as recited in claim 1, wherein the measurement system further comprises a housing in which the transmitter and receiver are positioned, and the housing is configured to connect to an element of a piping system.

4. The measurement device as recited in claim 1, wherein measurement device is operable to determine values of parameters of the fluid, and the parameters comprise: concentration of a material in the fluid; a specific gravity of a material in the fluid; a density of the fluid; dimensions and sizes of suspended solids, and/or particulates in the fluid; a velocity of the fluid; and, a pressure of the fluid.

5. The measurement device as recited in claim 1, wherein the processor is operable to determine the volumetric flow rate on a continuous and/or intermittent basis.

6. The measurement device as recited in claim 1, wherein the measurement device is operable to communicate electronically with a device that is operable to manage fluid flow in a piping system in which the measurement device is installed.

7. The measurement device as recited in claim 1, wherein the measurement device further comprises a reflector configured and arranged to direct the signal and/or the backscatter signal.

8. The measurement device as recited in claim 1, wherein the measurement device includes a connection operable to receive power, control signals, and communications, from one or more other devices.

9. The measurement device as recited in claim 1, wherein the fluid comprises any one or more of a gas, a liquid, and solids.

10. The measurement device as recited in claim 1, wherein a parameter of the backscatter signal is a function of a property of the fluid.

11. The measurement device as recited in claim 1, wherein the measurement device is operable to measure the volumetric flow rate in a system that is open to the atmosphere.

12. The measurement device as recited in claim 1, wherein the measurement device is operable to measure the volumetric flow rate in a system exposed to a pressure of 30,000 psi, or higher.

13. The measurement device as recited in claim 1, wherein the measurement device is operable to measure the volumetric flow rate without requiring that the fluid be compressed to obtain the volumetric flow rate.

14. The measurement device as recited in claim 1, wherein the measurement device is operable to measure the volumetric flow rate without the use of a radioactive source.

15. The measurement device as recited in claim 1, wherein the measurement system is operable to measure the volumetric flow rate while the measurement device is moving relative to the flow of the fluid.

16. A system comprising:
   a measurement device comprising;
   a doppler LiDAR unit comprising an optical transmitter operable to transmit a signal, and further comprising an optical receiver operable to receive a backscatter signal that comprises a portion of the signal; and
   a processor operable to:
      determine a doppler shift as between the signal and the backscatter signal; and
      use the doppler shift to determine a volumetric flow rate of a fluid to which the signal is directed, and from which the backscatter signal is received,
   and regardless of whether the signal is transmitted with, or against, a direction of flow of the fluid, the doppler LiDAR unit and processor are collectively operable to determine the volumetric flow rate, and a volume of the fluid; and
   system components, one of which is in fluid communication, at one or more times, with the measurement device, and the system components comprise any one or more of: a flare stack; a knockout; a vapor recovery unit; a valve; a well; and, a treater/separator.

17. A system comprising:
   a measurement device comprising;
   a doppler LiDAR unit comprising an optical transmitter operable to transmit a signal, and further comprising an optical receiver operable to receive a backscatter signal that comprises a portion of the signal; and
   a processor operable to:
      determine a doppler shift as between the signal and the backscatter signal; and
      use the doppler shift to determine a volumetric flow rate of a fluid to which the signal is directed, and from which the backscatter signal is received, and regardless of whether the signal is transmitted with, or against, a direction of flow of the fluid, the doppler LiDAR unit and processor are collectively operable to determine the volumetric flow rate, and a volume of the fluid; and system components, one of which is in fluid communication, at one or more times, with the measurement device, and the system components comprise one or more components and/or lines of a natural gas system.

18. A system comprising:
a measurement device comprising;
a doppler LiDAR unit comprising an optical transmitter operable to transmit a signal, and further comprising an optical receiver operable to receive a backscatter signal that comprises a portion of the signal; and
a processor operable to:
  determine a doppler shift as between the signal and the backscatter signal; and
  use the doppler shift to determine a volumetric flow rate of a fluid to which the signal is directed, and from which the backscatter signal is received,
and regardless of whether the signal is transmitted with, or against, a direction of flow of the fluid, the doppler LiDAR unit and processor are collectively operable to determine the volumetric flow rate, and a volume of the fluid; and
system components, one of which is in fluid communication, at one or more times, with the measurement device, and the system components comprise one or more components and/or lines of a wellsite.

19. A system comprising:
a measurement device comprising;
a doppler LiDAR unit comprising an optical transmitter operable to transmit a signal, and further comprising an optical receiver operable to receive a backscatter signal that comprises a portion of the signal; and
a processor operable to:
  determine a doppler shift as between the signal and the backscatter signal; and
  use the doppler shift to determine a volumetric flow rate of a fluid to which the signal is directed, and from which the backscatter signal is received,
and regardless of whether the signal is transmitted with, or against, a direction of flow of the fluid, the doppler LiDAR unit and processor are collectively operable to determine the volumetric flow rate, and a volume of the fluid; and
system components, one of which is in fluid communication, at one or more times, with the measurement device, and the system components comprise one or more components and/or lines of a power plant.

20. The system as recited in claim 19, wherein the power plant comprises a natural gas fired power plant, a coal-fired power plan, or an oil fired power plant.

21. A method, comprising:
transmitting, with a doppler LiDAR unit located inline in a piping system, a signal into a flow of fluid in the piping system, and the signal is either transmitted in a direction that is offset 10 degrees or less with respect to a direction of the flow of the fluid, or the signal is transmitted in a direction that is offset more than 10 degrees with respect to the direction of the flow of the fluid and is then reflected into the direction that is offset 10 degrees or less with respect to the direction of the flow of the fluid;
receiving a backscatter signal generated as a result of impingement of the signal on the fluid;
detecting a doppler shift as between the signal and the backscatter signal; and
determining, using the doppler shift, a velocity and/or a volumetric flow rate of the fluid.

22. The method as recited in claim 21, wherein the fluid comprises any one or more of a gas, a liquid, and solids.

23. The method as recited in claim 21, wherein the fluid comprises one or more hydrocarbons and/or hydrocarbon combustion products.

24. The method as recited in claim 21, wherein the signal is transmitted in an axial flow direction with respect to a piping system element in which the fluid is flowing.

25. The method as recited in claim 21, wherein a frequency analysis function is used to perform the detecting.

26. The method as recited in claim 21, wherein the fluid is flowing when the doppler shift is detected.

27. The method as recited in claim 21, wherein the detecting is performed either by direct detection through the use of an interferometer operable to optically analyze the backscatter signal, or by a combination of backscatter analysis and use of oscillating laser radiation to generate a detector output signal.

28. The method as recited in claim 21, wherein:
the signal is one of multiple signals transmitted by the doppler LiDAR unit per unit of time; and
each of the multiple signals causes generation of a respective backscatter signal, and the backscatter signals are each used to determine a respective individual distance measurement regarding a portion of the fluid; and
the method further comprises:
  combining the individual distance measurements to create a three dimensional point cloud of the fluid; and
  processing data of the point cloud.

29. The method as recited in claim 28, wherein the processing of the data of the point cloud comprises filtering the data, and using the filtered data to generate a three dimensional representation of the fluid and/or the piping system.

30. The method as recited in claim 21, wherein the method is performed at any one or more of: a wellsite; a natural gas-fired power plant; an oil-fired power plant; and a coal-fired power plant.

31. The method as recited in claim 21, wherein the signal is generated by a laser.

32. The method as recited in claim 21, wherein a spectral width of the signal is in a range of 0.1 nm to 2.0 nm and/or a wavelength of the signal is in a range of 300 nm to 1100 nm.

33. The method as recited in claim 21, wherein the signal comprises pulses of laser light.

34. The method as recited in claim 21, wherein the signal comprises a continuous signal.

35. The method as recited in claim 21, wherein the signal is transmitted in a direction against the direction of the flow of the fluid.

36. The method as recited in claim 21, wherein the signal is transmitted in a direction with the direction of the flow of the flow of the fluid.

37. The method as recited in claim 21, wherein the doppler LiDAR unit is operable to measure a distance from the doppler LiDAR unit to an object in the flow of fluid.

38. The method as recited in claim 21, wherein the doppler LiDAR unit is operable to determine a 3D location, in space, of one or more points on a surface of the piping system, and/or in the fluid flow.

39. The method as recited in claim 21, wherein the doppler LiDAR unit is operable to amplify the backscatter signal.

* * * * *